(12) United States Patent
Hong

(10) Patent No.: US 12,516,947 B2
(45) Date of Patent: Jan. 6, 2026

(54) METHOD AND SYSTEM FOR CONTROLLING AUTONOMOUS DRIVING BY SEARCH AND TRAIN OF AUTONOMOUS DRIVING SOFTWARE LINKED WITH ROUTE GUIDANCE

(71) Applicant: KAKAO MOBILITY CORP., Gyeonggi-do (KR)

(72) Inventor: Seung Hwan Hong, Gyeonggi-do (KR)

(73) Assignee: KAKAO MOBILITY CORP., Gyeonggi-do (KR)

( * ) Notice: Subject to any disclaimer, the term of this patent is extended or adjusted under 35 U.S.C. 154(b) by 172 days.

(21) Appl. No.: 18/084,946

(22) Filed: Dec. 20, 2022

(65) Prior Publication Data

US 2024/0192007 A1 Jun. 13, 2024

(30) Foreign Application Priority Data

Dec. 12, 2022 (KR) .................. 10-2022-0172560

(51) Int. Cl.
*G01C 21/34* (2006.01)
*G01C 21/00* (2006.01)
*G06F 18/22* (2023.01)

(52) U.S. Cl.
CPC ...... *G01C 21/3492* (2013.01); *G01C 21/3841* (2020.08); *G01C 21/3885* (2020.08); *G06F 18/22* (2023.01)

(58) Field of Classification Search
CPC ............ G01C 21/3492; G01C 21/3841; G01C 21/3885; G01C 21/3407; G06F 18/22;
(Continued)

(56) References Cited

U.S. PATENT DOCUMENTS 10,324,463 B1 * 6/2019 Konrardy ............... G01S 19/39
10,479,356 B1 * 11/2019 Haque ................... B60W 30/09
(Continued)

FOREIGN PATENT DOCUMENTS

JP 2018185229 A * 11/2018
JP 2022-094838 A 6/2022
(Continued)

OTHER PUBLICATIONS

JP-2018185229-A machine translation (Year: 2018).*

*Primary Examiner* — Angelina M Shudy
(74) *Attorney, Agent, or Firm* — IP Legal Services, LLC

(57) ABSTRACT

Disclosed herein a method and system for controlling autonomous driving by search and train of autonomous driving software linked with route guidance.
The method includes: generating route information based on a route request of a moving object and associated information according to the route request, searching and selecting, based on the route information and the associated information, driving information including driving data and driving software, the driving data being associated with recognition, determination and control of autonomous driving for a route and driving control, training the driving software by using the route request, the associated information and the driving data, and distributing the driving information to the moving object and executing driving control of the moving object based on the driving information.

12 Claims, 15 Drawing Sheets

(58) Field of Classification Search
CPC .......... B60W 60/001; B60W 60/0059; B60W 2555/20; B60W 2556/40; B60W 2556/50; G06N 3/08; G06N 20/00; G05D 1/00; G08G 1/00
See application file for complete search history.

(56) References Cited

U.S. PATENT DOCUMENTS

| | | | | |
|---|---|---|---|---|
| 11,060,882 | B2* | 7/2021 | Di Pietro | G01C 21/3679 |
| 11,091,156 | B2* | 8/2021 | Haque | G01C 21/28 |
| 11,378,956 | B2* | 7/2022 | Zhang | B60W 60/001 |
| 11,481,918 | B1* | 10/2022 | Ebrahimi Afrouzi | A47L 11/4008 |
| 11,573,573 | B2* | 2/2023 | Zheng | G06V 20/56 |
| 11,858,536 | B1* | 1/2024 | Liu | G06N 3/0464 |
| 11,891,088 | B1* | 2/2024 | Kobilarov | G07C 5/0808 |
| 11,912,301 | B1* | 2/2024 | Hendy | B60W 60/00276 |
| 11,928,618 | B2* | 3/2024 | Yano | G06Q 50/40 |
| 11,970,172 | B2* | 4/2024 | Ohnishi | B60W 60/0054 |
| 2004/0064235 | A1* | 4/2004 | Cole | B60T 8/172 701/70 |
| 2004/0068351 | A1* | 4/2004 | Solomon | G05D 1/104 701/302 |
| 2009/0002148 | A1* | 1/2009 | Horvitz | G08G 1/0112 340/514 |
| 2009/0082879 | A1* | 3/2009 | Dooley | G06N 3/004 700/3 |
| 2009/0192705 | A1* | 7/2009 | Golding | G01C 21/3484 701/533 |
| 2010/0174479 | A1* | 7/2010 | Golding | G01C 21/3484 706/14 |
| 2012/0083947 | A1* | 4/2012 | Anderson | G08G 1/166 701/1 |
| 2015/0178067 | A1* | 6/2015 | Ji | G01C 21/36 717/170 |
| 2017/0115127 | A1* | 4/2017 | Kim | G01C 21/3605 |
| 2017/0328725 | A1* | 11/2017 | Schlesinger | G01C 21/3438 |
| 2018/0232947 | A1* | 8/2018 | Nehmadi | G01S 7/295 |
| 2018/0272963 | A1* | 9/2018 | Meyhofer | B60W 50/023 |
| 2018/0339712 | A1* | 11/2018 | Kislovskiy | H04L 67/34 |
| 2018/0341261 | A1* | 11/2018 | Kislovskiy | G06N 20/00 |
| 2018/0341571 | A1* | 11/2018 | Kislovskiy | G06F 11/0739 |
| 2018/0341888 | A1* | 11/2018 | Kislovskiy | G08G 1/096838 |
| 2018/0342033 | A1* | 11/2018 | Kislovskiy | G01C 21/3697 |
| 2018/0348784 | A1* | 12/2018 | Zheng | G06V 30/194 |
| 2019/0079514 | A1* | 3/2019 | Zhu | G08G 1/00 |
| 2019/0113918 | A1 | 4/2019 | Englard et al. | |
| 2019/0113919 | A1 | 4/2019 | Englard et al. | |
| 2019/0113920 | A1 | 4/2019 | Englard et al. | |
| 2019/0113927 | A1 | 4/2019 | Englard et al. | |
| 2019/0185010 | A1* | 6/2019 | Ganguli | G05D 1/0217 |
| 2019/0187705 | A1 | 6/2019 | Ganguli et al. | |
| 2019/0196485 | A1* | 6/2019 | Li | B60W 30/0956 |
| 2019/0220043 | A1* | 7/2019 | Zamora Esquivel | G06V 10/82 |
| 2019/0265060 | A1* | 8/2019 | Han | G01C 21/3492 |
| 2019/0281052 | A1* | 9/2019 | Lekkas | H04L 9/14 |
| 2019/0302761 | A1* | 10/2019 | Huang | G02B 27/017 |
| 2020/0117200 | A1* | 4/2020 | Akella | B60W 50/0097 |
| 2020/0117205 | A1* | 4/2020 | Ha | B60W 60/001 |
| 2020/0149906 | A1* | 5/2020 | Tu | G06V 20/58 |
| 2020/0189579 | A1* | 6/2020 | Haque | B60W 30/09 |
| 2020/0189600 | A1* | 6/2020 | Tsuji | B60W 60/0011 |
| 2020/0209852 | A1* | 7/2020 | Soryal | H04W 4/024 |
| 2020/0209858 | A1* | 7/2020 | Trofymov | G06N 3/08 |
| 2020/0231177 | A1* | 7/2020 | Ferzli | G06F 16/957 |
| 2020/0257301 | A1* | 8/2020 | Weiser | G08G 1/163 |
| 2020/0339151 | A1* | 10/2020 | Batts | B60W 60/00186 |
| 2020/0356951 | A1* | 11/2020 | Cristache | G06Q 10/10 |
| 2020/0361480 | A1* | 11/2020 | Rodriguez Bravo | B60W 60/0015 |
| 2020/0393841 | A1* | 12/2020 | Frisbie | G05D 1/0221 |
| 2020/0406906 | A1* | 12/2020 | Omari | G05D 1/0223 |
| 2021/0009154 | A1* | 1/2021 | Wray | G08G 1/163 |
| 2021/0094561 | A1* | 4/2021 | Jiang | B60W 50/045 |
| 2021/0123757 | A1* | 4/2021 | Lee | G01C 21/26 |
| 2021/0156960 | A1* | 5/2021 | Popov | G01S 13/5242 |
| 2021/0188311 | A1* | 6/2021 | Cho | B60W 50/14 |
| 2021/0248460 | A1* | 8/2021 | Sykora | G06N 3/08 |
| 2021/0286923 | A1* | 9/2021 | Kristensen | G01S 7/412 |
| 2021/0316763 | A1* | 10/2021 | Domahidi | B60W 40/105 |
| 2021/0333119 | A1* | 10/2021 | Ramesh | G06Q 50/04 |
| 2021/0341935 | A1* | 11/2021 | Du | G01M 17/06 |
| 2021/0383209 | A1* | 12/2021 | Brahma | G06V 20/56 |
| 2021/0406262 | A1* | 12/2021 | Unnikrishnan | G06F 16/53 |
| 2021/0406560 | A1* | 12/2021 | Park | G06T 7/70 |
| 2022/0011776 | A1* | 1/2022 | Narang | G06F 18/217 |
| 2022/0063658 | A1* | 3/2022 | Yokoyama | G07C 5/008 |
| 2022/0161816 | A1* | 5/2022 | Gyllenhammar | G06V 20/56 |
| 2022/0161818 | A1 | 5/2022 | Solmaz et al. | |
| 2022/0176994 | A1* | 6/2022 | Bhagat | H04L 67/125 |
| 2022/0187080 | A1* | 6/2022 | Ehara | G01C 21/3661 |
| 2022/0324467 | A1* | 10/2022 | Alvarez | G08G 1/096725 |
| 2022/0350335 | A1* | 11/2022 | Reschka | G05D 1/0088 |
| 2022/0391712 | A1* | 12/2022 | Karri | G16Y 10/75 |
| 2023/0080319 | A1* | 3/2023 | Zhang | G01C 21/3807 701/26 |
| 2023/0194291 | A1* | 6/2023 | Dagley | G01C 21/3626 701/533 |
| 2023/0234613 | A1* | 7/2023 | Whiteside | B60W 50/045 701/23 |
| 2023/0274645 | A1* | 8/2023 | Dürr | G05D 1/0289 701/2 |
| 2023/0419113 | A1* | 12/2023 | Genc | G06F 16/904 |
| 2024/0028601 | A1* | 1/2024 | Zheng | G06F 16/243 |
| 2024/0092390 | A1* | 3/2024 | Philion | G06N 3/006 |
| 2024/0192004 | A1* | 6/2024 | Mezaael | G06Q 10/06311 |
| 2024/0330065 | A1* | 10/2024 | Acharya Chandrashekar | G06F 9/505 |
| 2025/0076486 | A1* | 3/2025 | Burlina | G01S 13/867 |
| 2025/0181961 | A1* | 6/2025 | Beaurepaire | G01C 21/3461 |

FOREIGN PATENT DOCUMENTS

| | | |
|---|---|---|
| KR | 10-2018-0087968 A | 8/2018 |
| KR | 10-2021-0070273 A | 6/2021 |

* cited by examiner

METHOD AND SYSTEM FOR CONTROLLING AUTONOMOUS DRIVING BY SEARCH AND TRAIN OF AUTONOMOUS DRIVING SOFTWARE LINKED WITH ROUTE GUIDANCE

CROSS REFERENCE TO RELATED APPLICATION

The present application claims priority to a Korean patent application No. 10-2022-0172560, filed Dec. 12, 2022, the entire contents of which are incorporated herein for all purposes by this reference.

BACKGROUND OF THE INVENTION

Field of the Invention

The present disclosure relates to a method and apparatus for controlling autonomous driving by search and training of autonomous driving software linked with route guidance and, more particularly, to a method and apparatus for controlling autonomous driving by search and training of autonomous driving software linked with route guidance that processes massive and complex data and software, which are applied to autonomous deriving, so as to efficiently interwork with route control.

Description of the Related Art

Autonomous driving systems are being developed in various mobility areas for the purpose of commercialization. For example, mobility may be a service based on a moving object like vehicle, robot, drone, ship and other moving objects that carry people and things.

An autonomous driving system may have software, which performs recognition, determination and control through various tests, and set up data utilized for autonomous driving. For example, the data may be detailed maps and data for training. In the system, software and data are installed in an autonomous driving computing device and performs a service.

In addition, as wireless software update techniques are developed in recent years, a server may update software and send it to a moving object by using the wireless communication technology. Receiving updated software, the moving object provides software-based services in forms of navigation, advanced driver assistance system (ADAS), in-vehicle infotainment (IVI) and the like.

Various studies are underway to combine wireless data share and update techniques as for autonomous driving systems. Unlike a conventional system applied to services in vehicles, software and data in an autonomous driving system have a high degree of complexity and still have no standardized driving situation and environment so that it is difficult to provide appropriate software and data.

SUMMARY

The present disclosure is technically directed to provide a method and apparatus for controlling autonomous driving by search and training of autonomous driving software linked with route guidance that processes massive and complex data and software, which are applied to autonomous driving, so as to efficiently interwork with route control.

The technical objects of the present disclosure are not limited to the above-mentioned technical objects, and other technical objects that are not mentioned will be clearly understood by those skilled in the art through the following descriptions.

According to an aspect of the present disclosure, a method for controlling autonomous driving by search and training of autonomous driving software linked with route guidance is provided. The method includes: generating route information based on a route request of a moving object and associated information according to the route request, searching and selecting, based on the route information and the associated information, driving information including driving data and driving software, the driving data being associated with recognition, determination and control of autonomous driving for a route and driving control, training the driving software by using the route request, the associated information and the driving data, and distributing the driving information to the moving object and executing driving control of the moving object based on the driving information.

The features briefly summarized above with respect to the present disclosure are merely exemplary aspects of the detailed description below of the present disclosure, and do not limit the scope of the present disclosure.

According to another aspect of the present disclosure, an apparatus for controlling autonomous driving by search and training of autonomous driving software linked with route guidance is provided.

According to the present disclosure, it is possible to provide a method and apparatus for controlling autonomous driving by search and training of autonomous driving software linked with route guidance that processes massive and complex data and software, which are applied to autonomous driving, so as to efficiently interwork with route control.

According to the present disclosure, it is possible to minimize time, computing resources and cost required for an autonomous driving object to update driving information, that is, software and driving data for recognition, determination and control necessary for autonomous driving.

According to the present disclosure, when collecting and providing driving information to an autonomous driving object, a driving scenario may be generated along with route information according to driving request information including various types of data, for example, user information, information on infrastructure on a route, traffic information, environment information, and other information obtained from a sensor of the moving object. When there is no search result for existing data and software corresponding to a driving scenario, a series of processing suitable for the driving scenario, such as simulation, data transformation, data augmentation, and model creation may be performed based on data obtained by a moving object, and thus driving data and driving software may be provided for model training. Accordingly, the performance and safety of an autonomous driving object may be improved.

According to the present disclosure, processing for autonomous driving data and autonomous driving software may be automated and become light-weighted. The processing may include simulation, data transformation, data augmentation and model creation. For the above processing, a processing process for raw data collected from a moving object may be automated. The processing process for the raw data may include sensor fusion, labeling, annotation, metadata input work, transformation, and augmentation. In addition, driving information may be retrieved and packaged based on candidate route information and be provided to a moving object.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
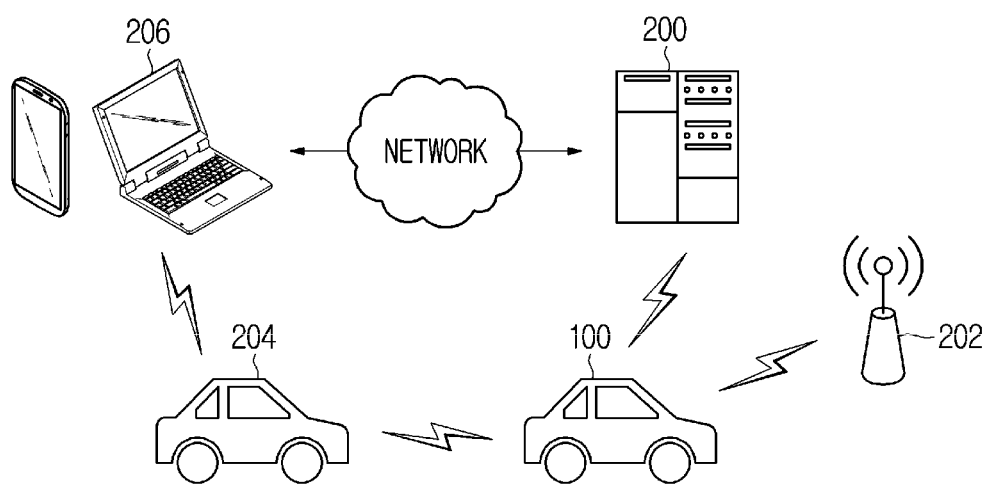
FIG. 1 is a view illustrating that a moving object communicates with other devices via a network.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as" at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

FIG. 1 is a view illustrating that a moving object communicates with other devices via a network.

Referring to FIG. 1, the moving object 100 may refer to a device capable of moving. For example, the moving object may be a vehicle, a personal mobility, a mobile office, or a mobile hotel. The vehicle may be a four-wheel car, for example, a sedan, a sports utility vehicle (SUV), and a pickup truck and may also be a car with five or more wheels, for example, a lorry, a container truck, and a heavy vehicle. The moving object 100 may be an aerial or marine moving object, apart from a land moving object, such as a drone, a personal aerial vehicle (PAV) or a ship. The moving object 100 may be realized by manned driving or autonomous driving (either semi-autonomous or full-autonomous driving), and in the present disclosure, the description will focus on the moving object as a device operated by autonomous driving.

The moving object 100 may communicate with another moving object 204 or another device. For example, another device may include a server 200 capable of supporting autonomous driving, an ITS device 202 for receiving information from an intelligent transportation system (ITS), and various types of user device 206. The server 200 may transmit driving information and various information used for controlling a route to the moving object 100 in response to a request and data transmitted from the moving object 100. The driving information may be information used for the autonomous driving of the moving object 100. Specifically, it may include driving data, which is associated with autonomous driving recognition, determination and control, a driving software module, driving data, and driving software. Hereinafter, the terms "driving software module" and "driving software" may be used interchangeably for convenience of description. Detailed description will be provided below. For example, the ITS device 202 may be a road side unit. At a request of the moving object 100, the ITS device 202 may transmit associated information affecting driving control of a route to the moving object 100.

The moving object 100 may communicate with another moving object or another device based on cellular communication, WAVE communication, DSRC (Dedicated Short Range Communication) and other communication systems. For example, as a cellular communication network, a communication network such as LTE, 5G, WiFi communication network, WAVE communication network, etc. may be used. In addition, a local area network used in the moving object 100, such as DSRC may be used, and the present disclosure is not limited to the above-described embodiment.

The server 200 may manage various types of driving information for managing the route and driving control of the moving object 100 during communication with the moving object 100. When the moving object 100 cannot generate or select driving information based on a route and associated information described below, the server 200 may retrieve driving information matching the route and associated information and provide driving information necessary for the moving object 100. When the server 200 has no driving information matching the route and associated information, it may generate driving information through a training process and provide it.

Figure 2:
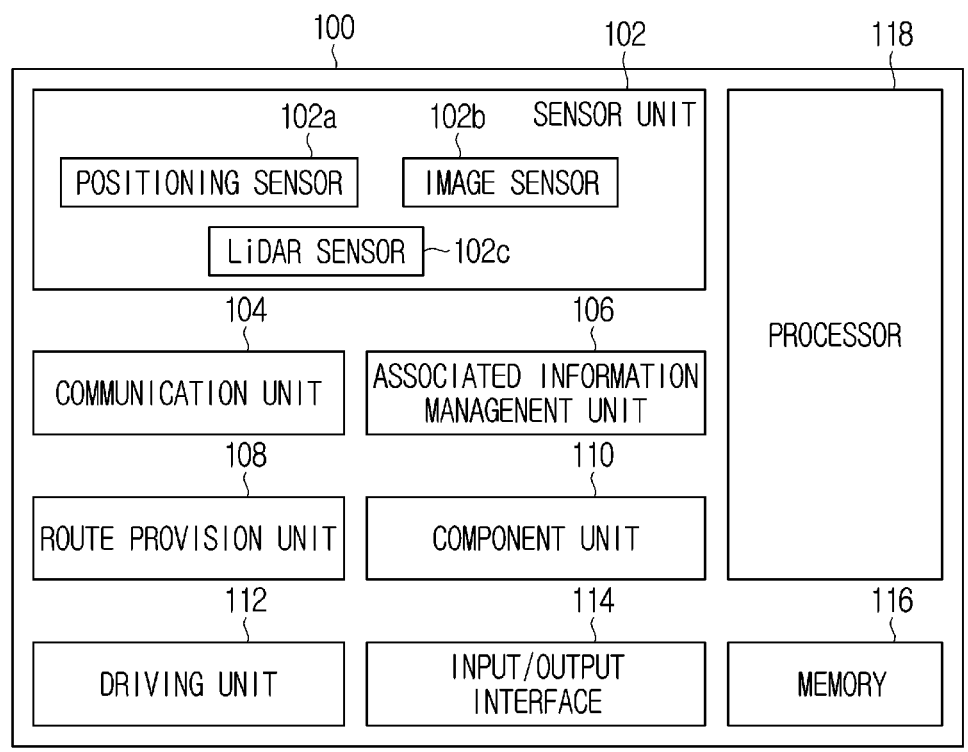
FIG. 2 is a view illustrating a system configuration implemented in a moving object according to an embodiment of the present disclosure.

FIG. 2 is a view illustrating a system configuration implemented in a moving object according to an embodiment of the present disclosure.

The moving object 100 may include a sensor unit 102, a communication unit 104, a associated information management unit 106, a route provision unit 108, a component unit 110, a driving unit 112, an input/output interface 114, a memory 116, and a processor 118. In the present disclosure, the moving object 100 is described with an example of an autonomous driving vehicle among various types of mobilities.

The sensor unit 102 may have multiple sensors. For example, the sensor unit 102 may have a positioning sensor 102a, an image sensor 102b, and various types of sensors.

For example, the positioning sensor 102a may acquire location data of the moving object 100 by including a GNSS, an IMU sensor, a navigation sensor, a GPS sensor, an INS sensor, a UWB sensor, and a geomagnetic system, which are capable of collecting information on the location and direction of the moving object 100. The image sensor 102b may acquire the environment and objects around the moving object 100 in the form of image data. The LiDAR sensor 102c may acquire pointcloud, that is, LiDAR data for a surrounding environment and an object through laser scanning around the moving object 100. The sensor unit 102 may further include a radar sensor capable of recognizing a surrounding environment. Although not illustrated in the view, the sensor unit 102 may have a weather sensor like a temperature sensor and a pressure sensor. In addition, the sensor unit 102 may include various sensors for detecting the generation and operation like driving, steering and braking while the moving object 100 is running.

The communication unit 104 may communicate with the server 200, the ITS device 202 and another moving object to receive associated information that is not obtained from the multiple sensors of the moving object 100 or is not managed in the moving object 100. Associated information obtained from the server 200 or an external device may be waypoint information, event information, road information, map information, and measurement information of another device.

The associated information management unit 106 may generate associated information considered for driving control of the moving object 100 according to a route generated by the route provision unit 108 and manage the associated information through the memory 116. The associated information may be generated according to the reception of relevant data and keep unchanged or may vary according to real-time reception of relevant data.

In addition, the associated information management unit 106 may receive from an external device and manage associated information that is not generated or managed in the moving object 100. For example, the external device may be the server 200, the ITS device 202, another moving object 204, and another user device 206.

For example, associated information may include route request information input by a user, user information, pattern information, information of moving object, moving object state information. In addition, associated information may further include observation information, map information, space information, event information, waypoint information, road information, and constraint information.

Route request information may be departure information and starting point information that a user inputs through the input/output interface 114. For example, starting point information may be automatically set based on a current location or be separately set by a user's input. In addition, route request information may further include waypoint information. Waypoint information may be determined by a user's input or a setting of the moving object 100. As for the setting of the moving object 100, based on a history of a user's driving on a same or similar route as route request information, a waypoint, in which the user parked in a predetermined frequency or more frequently, may be set as waypoint information. The history may be identified from pattern information that is managed by the associated information management unit 106. The pattern information will be described in detail below.

User information is personal information of an occupant using the moving object 100 and may include, for example, user identification information, age, sex, and health. User information may be obtained through a user's input or communication with another device. For example, another device may be an individual device of a user who occupies the moving object 100, and the moving object 100 may receive personal information stored in a user device.

Pattern information may be a driving control pattern, which a user receives in a predetermined frequency during driving control according to a route of the moving object 100, or a driving control pattern reflected in the driving control according to a user's request.

For example, pattern information may be a past driving route and history information associated with driving control applied to the past driving route, a user's driving and use patter of the moving object, a moving object route provided based on driving information, a select pattern of an option associated with driving control, and information associated with a moving object usage pattern when a specific passenger is in the moving object. Pattern information may be estimated as the processor 118 analyzes an option type that a user selects through the input/output interface 114 of the moving object 100. In addition, pattern information may include a driving pattern including a route used by a user and a manipulation pattern of the moving object 100, when a specific passenger input from the moving object 100 rides it. In addition, pattern information may include event information, a driving pattern used by a user in association with weather information, waypoint information, and a route where the user drove. In addition, pattern information may include a usage pattern associated with a module of the component unit 110 that requires at least a predetermined value of energy consumption. For example, the following may be recognized: when the moving object 100 is running on a route, if the outdoor temperature or the indoor temperature of the moving object 100 reaches a predetermined value, a user regularly takes a specific action to operate a heater or an airconditioning system that requires a lot of energy consumption. The processor 118 may recognize a user's behavior of using an air-conditioning system under a specific condition as a usage pattern, and the associated information management unit 106 may manage the usage pattern as pattern information.

Information of moving object may be information associated with the specification of the moving object 100. For example, the information of moving object may be information associated with the energy source, type, age and performance of the moving object 100.

state information of moving object may be information associated with the state of the component unit 110. The component unit 110 may include an energy system, an air-conditioning system, a brake system, a driving system, a light system, and a convenience system. State information associated with an energy system may include, for example, a residual amount of energy, a distance which a moving object can cover, and the like. For example, state information associated with the above-described systems may include the performance of modules constituting each system, normal/abnormal states and the like. In addition, moving object state information may further include information associated with the type, weight and shape of an object in the moving object 100.

Observation information may include data associated with a surrounding environment of the moving object 100, which is obtained from an observation sensor of the moving object 100 or from an external device. For example, an observation sensor may be at least one of the image sensor 102b, the LiDAR sensor 102c, and a radar sensor. Observation information may consist of data about location, type, motion and shape associated with an object near a moving object. An object may be a static object or a dynamic object. A static object may be a fixed facility or a similar object without mobility. A dynamic object is an object with mobility such as a person and another moving object, and a dynamic object may be determined, for example, by analyzing data obtained from an observation sensor through a training model. In addition, an object may be a transient static object or a transient dynamic object. For example, a transient static object may be an object that is recognized as a dynamic state based on data obtained from an observation sensor but is determined as a static state since it has no impact on the driving control of the moving object 100. For example, a transient dynamic object may be an object that is recognized as an actual static state but is determined as a dynamic state since it affects the driving control of the moving object 100. Transient static and transient dynamic objects may be determined through a predetermined training model.

Observation information may include type information of each sensor and inter-sensor geometric information for matching and fusing of various sensors. Geometric information may include internal geometric information and external geometric information that are derived based on sensor data obtained while the moving object 100 is running and unique information intrinsic to a sensor.

Map information may be stored in at least one of databases of the memory of the moving object 100 and the server 200, and the associated information management unit 106 may obtain map information according to route request information by means of a request. In order to retrieve or select driving information, the associated information management unit 106 may provide map information thus obtained to the processor 118. Various types of data including road, road side unit and lane information may be represented in map information. Map information may include heterogeneous map data in a same area. For example map information may have a map based on a road network and a map based on a lane network. Specifically, a lane-based map may be set up in lane units or with high precision of centimeter units.

Space information may be stored in at least one of databases of the memory of the moving object 100 and the server 200, and the associated information management unit 106 may obtain space information according to route request information by means of a request. Space information may be structured in a three-dimensional space associated with map information according to each view. Specifically, space information may organize and store history information of an object on a map according to each view and record various information associated with the object in the form of metadata. For example, software may include driving software that is globally or locally used. In addition, when software used for a moving object route and driving control, relevant parameters, and a specific model of the software are optimized and updated, space information may cumulatively store software-related information regarding the software, parameters and specific model applied to a corresponding area.

Event information may be information on various situations that occur around or on an expected route of the moving object 100. For example, event information may be information associated with a traffic condition, an accident, a maintenance work, and a local weather condition. Event information may be obtained from an external device.

Waypoint information may include information associated with a waypoint present on a route. As an example, waypoint information may include information associated with a waypoint selected on a route based on user information and moving object state information.

Road information may be information associated with a road on a route that is considered for driving control. For example, road information may include slope, road surface, curvature, and pavement condition on a route.

Constraint information may be information associated with a regulation required for the moving object 100 according to information of moving object and a route. For example, constraint information may include a route with a predetermined level of accident risk and above for autonomous driving, information associated with autonomous driving restriction on the route, restriction information on driving control according to a safety ranking and authentication of the moving object 100, and restriction information on driving control required by a road condition and an environment.

Meanwhile, the route provision unit 108 may generate global route information based on a user's route request information and at least a portion of associated information through cooperation with the processor 118. In addition, for detailed control of route in a current driving location, the route provision unit 108 may generate local route information based on at least a pat of data and associated information collected in real time through cooperation with the processor 118. Autonomous driving of the moving object 100 may be controlled based on global and local route information thus generated. In the present disclosure, the route provision unit 108 is illustrated as a separate module from the processor 118, but as another example, the route provision unit 108 may be included in the processor 118 so that the processor 118 can function as the route provision unit 108.

For example, the component unit 110 may include an energy system, an air-conditioning system, a brake system, a driving system, a light system, and a convenience system. For example, an energy system may include a module for providing an energy source like fuel and battery and an energy management module. For example, a convenience system may include a module for providing an additional convenient service to a user like seats and infotainment. The sensor unit 102 may have various types of sensors for recognizing the condition of each system of the component unit 110.

The driving unit 112 may execute a mechanical operation of the moving object 100 by the control of the processor 118. The driving unit 112 may be a power system for delivering power to front and rear wheels, a brake system, and a steering system that delivers the direction of the moving object 100 according to steering.

The input/output interface 114 may function as a user interface. The input/output interface 114 may display information associated with the route, operation state and control state of the moving object 100 by means of the processor 118. The input/output interface 114 may be configured as a touch screen capable of detecting a user input or as a microphone capable of recognizing a user's voice and may receive a user's request that gives a command to the processor 118. For example, when route request information may be received by the input/output interface 114, the processor 118 may set a route and drive the moving object 100 based on driving information suitable for the route.

The memory 116 may store associated information and driving information. Driving information may include driving data and driving software. The server 200 may store and manage a massive amount of driving information that is not stored in the memory 116.

Driving information is associated with associated information and may include information that is used to select at least one of a plurality of driving datasets and software. In addition, when existing driving software is determined not to apply to driving control according to a route, driving data may be data that is used to train, update or modify the existing driving software. For example, due to a new driving environment, driving data with highest similarity to the environment may be used for the above-described processing for driving software with highest similarity to the environment. Driving data may include a parameter associated with associated information and a weight of the parameter.

For example, when associated information has user information with a specific age and health condition, pattern information of a specific user and event information, driving data may include various data that is accumulated in association with the above-described information. Specifically, detailed route, speed and driving method, which another user with a specific age and health condition prefers or frequently uses, may be an example of driving data. As another example, in the case of pattern information of a specific user, driving data may include a detailed route, a driving method, various information of a waypoint and the like, which are associated with the pattern information. As another example, when associated information is event information, specific control data may be data associated with an avoidance route according to a situation of event information and a driving method.

Driving software may be a training model that embodies an optimal route and driving control based on the route and associated information of the moving object 100. A plurality of driving software may be provided for various routes and multiple pieces of associated information. When the processor 118 executes driving software that is selected as an optimal one, driving control on a route may be processed specifically. Driving control may include a route determination for autonomous driving and specific driving control. For example, driving control may be a change of route, driving control on a maintained route and the like.

The processor 118 may control the above-described components and instruct each component for route and driving control according to an applied algorithm. In addition, the processor 118 may retrieve driving information associated with associated information and train driving software to generate optimal driving information. The processor 118 may distribute the optimal driving information to be applied to the moving object 100 and distribute it to an external device.

Figure 3:
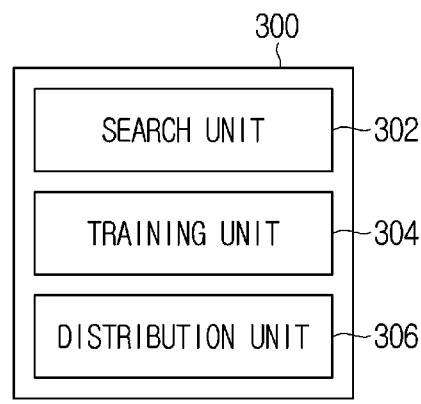
FIG. 3 is a view illustrating a configuration of a processor of a moving object and a server according to an embodiment of the present disclosure.

FIG. 3 is a view illustrating a configuration of a processor of a moving object and a server according to an embodiment of the present disclosure. In the present disclosure, the description will focus on a module commonly functioning in the processors of the moving object 100 and the server 200. The processor 118 of the moving object 100 is actually the same as the processor 300 shown in FIG. 3.

The processor 118 may include a search unit 302 capable of searching driving data and driving software based on route request information and associated information, a training unit 304 capable of executing train, update or modification of driving software by means of driving data associated with a route request information and associated information, and a distribution unit 306 capable of distributing driving data and driving software to the moving object 100. In case the processor 118 is embedded in the server 200, the distribution unit 306 may optimized driving information to the moving object 100 through communication with the moving object 100.

Figure 4:
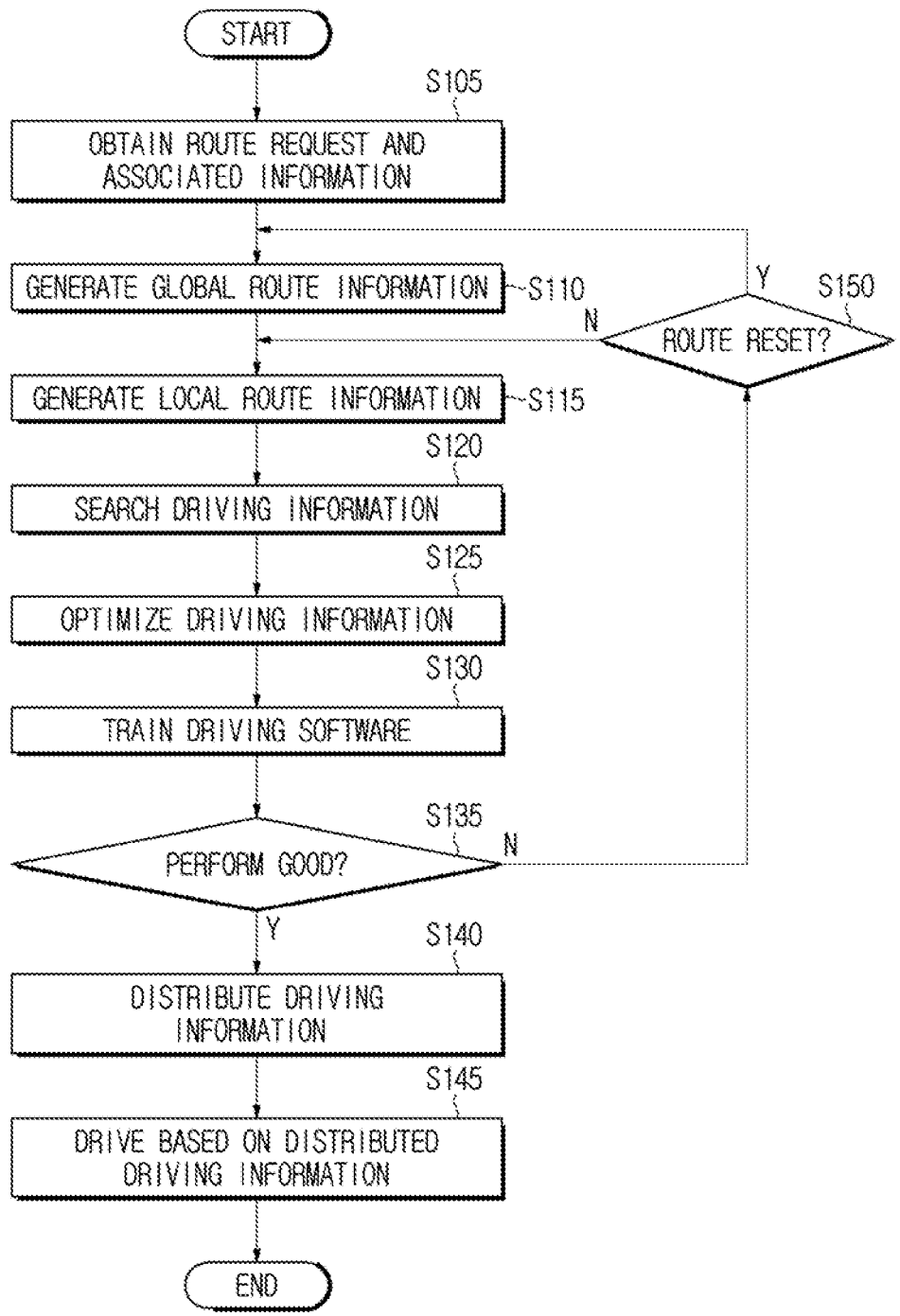
FIG. 4 is a flowchart for a method of controlling autonomous driving linked with route guidance according to an embodiment of the present disclosure.

FIG. 4 is a flowchart for a method of controlling autonomous driving linked with route guidance according to an embodiment of the present disclosure.

First, a user of the moving object 100 may request a route via the input/output interface 114, and the processor 118 may obtain associated information from the associated information management unit 106 based on route input information (S105).

Information according to the route request may be generated by the user's input or a setting of the moving object 100. The user's route request information may include at least destination information. In addition, for example, the user's route request information may further include departure point information and waypoint information. Based on the setting of the moving object 100, the route provision unit 108 may generate route request information by checking the user's driving purpose, time, and past route request information according to pattern information of associated information.

Even when the user does not input separate information, the route request information may further include information based on associated information input by the user. For example, the route provision unit 108 may add moving object state information of the associated information and the waypoint information identified from the user information to the route request information. When the residual amount of energy is not sufficient according to the moving object state information or when a portion of modules of the component unit 110 are in an abnormal state, the moving object 100 may not be able to operate until a destination. The route provision unit 108 may include an energy feeding place and a maintenance place as waypoint information based on the moving object state information of the above-described example. As another example, when at least portion of passengers are aging or in poor health condition, the route provision unit 108 may include a rest area as waypoint information based on the user information in the above-described example. When waypoint information of associated information has parking lot information at a waypoint, the route provision unit 108 may further include the parking lot information in waypoint information.

When route request information is generated, the processor 118 may extract and provide associated information associated with the route request information to the route provision unit 108. The processor 118 may extract pattern information associated with a destination and a passenger, user information, and moving object state information according to a route request.

Next, the processor 118 may control the route provision unit 108 and generate global route information based on route request information (S110).

The route provision unit 108 may further request associated information for generating the global route information. For example, associated information, which is additionally requested, may be map information, event information, road information, and constraint information. Map information stored in the memory 116 may be at least one of network maps in road and lane units. For example, when a planned route to a destination includes a heavily congested area, an area with heavy rainfall forecast, an area with high probability of accident with respect to autonomous driving, or an area under maintenance or construction work, the route provision unit 108 may analyze map information and establish a global route to avoid the above-described areas preferably.

Next, the processor 118 may control the route provision unit 108 to generate local route information in a real-time location based on a real-time location and route request information of the moving object 100 (S115).

The route provision unit 108 may further request associated information for generating the local route information. For example, associated information, which is additionally requested, may be observation information, space information of a corresponding location, and map information of the corresponding location.

The route provision unit 108 may compare a surrounding environment and an object, which are obtained from an observation sensor, with space information to identify static and dynamic objects and establish a local route based on an object thus identified and map information.

Next, the processor 118 may use the search unit 302 to search driving information based on global and local route information and associated information (S120).

The processor 118 may generate at least one driving scenario based on route information and associated information. For example, a driving scenario may be generated from metadata extracted from the above-described information and define a driving environment, a state of the moving object 100, and a traffic situation. Detailed description will be provided below.

The processor 118 may obtain metadata from the driving scenario and associated information and search driving data and at least one driving software program based on the obtained metadata.

Next, the processor 118 may optimize driving information by using the training unit 304.

For example, the searched driving data may be optimized for analysis, training of driving software, and a current driving situation.

Next, the processor 118 may control the training unit 304 to train the driving software based on the driving data (S130).

The driving software may include an algorithm for recognizing a surrounding environment, an algorithm for setting a driving determination and a plan, and set values and weights associated with surrounding environment recognition, driving determination and driving control. For example, the driving software may be a training model with multiple layers which receives multi-dimensional data, recognizes a surrounding environment, and outputs driving control output values for determining and controlling a route and driving.

Next, the processor 118 may control the training unit 304 to evaluate the performance of the driving software according to route information and driving data and determine whether or not the driving software has good performance (S135).

For example, when the reliability based on a driving control output value of the trained driving software is equal to or greater than a threshold, the training unit 304 may determine that the software has good performance. In case there is a plurality of driving software programs, the training unit 304 may determine that a software program with highest reliability among driving software programs with reliability equal to or greater than the threshold has good performance.

When the performance is good, the processor 118 may distribute driving information including driving data and driving software to the moving object 100 and the server 200 (S140).

Next, the processor 118 may control the moving object 100 to execute driving according to route information based on the distributed driving information (S145).

The processor 118 may update the driving software based on driving control that is actually applied while the moving object 100 is running, and the updated driving software may be managed in association with a route and associated information.

When the performance is not good, the processor 118 may control the route provision unit 108 to determine whether or not to reset route information (S150).

For example, the resetting of route information may be determined based on whether or not an evaluation result value based on global route information is below a reference value. For example, when no similar tendency to the user's pattern information is found or excessive waypoint information is included in comparison with a waypoint estimated based on moving object state information or user information, the evaluation result value for global route information may not reach a reference value. According to the above-described example, the route provision unit 108 may determine to reset a global route.

When the resetting of route information is determined, the processor 118 may control the route provision unit 108 to reset global route information based on route request information and proceed the steps after the step S115 again.

If resetting of route information is not determined, the route provision unit 108 may be controlled to regenerate local route information in a real-time location based on a real-time location and route request information of the moving object 100. After regenerating the local route information, the processor 118 may proceed to the process after the step S120.

For example, when an evaluation result value based on the global route information is equal to or greater than a reference value, the route provision unit 108 may maintain the global route information and regenerate local route information at a local point where the moving object is located.

Figure 5:
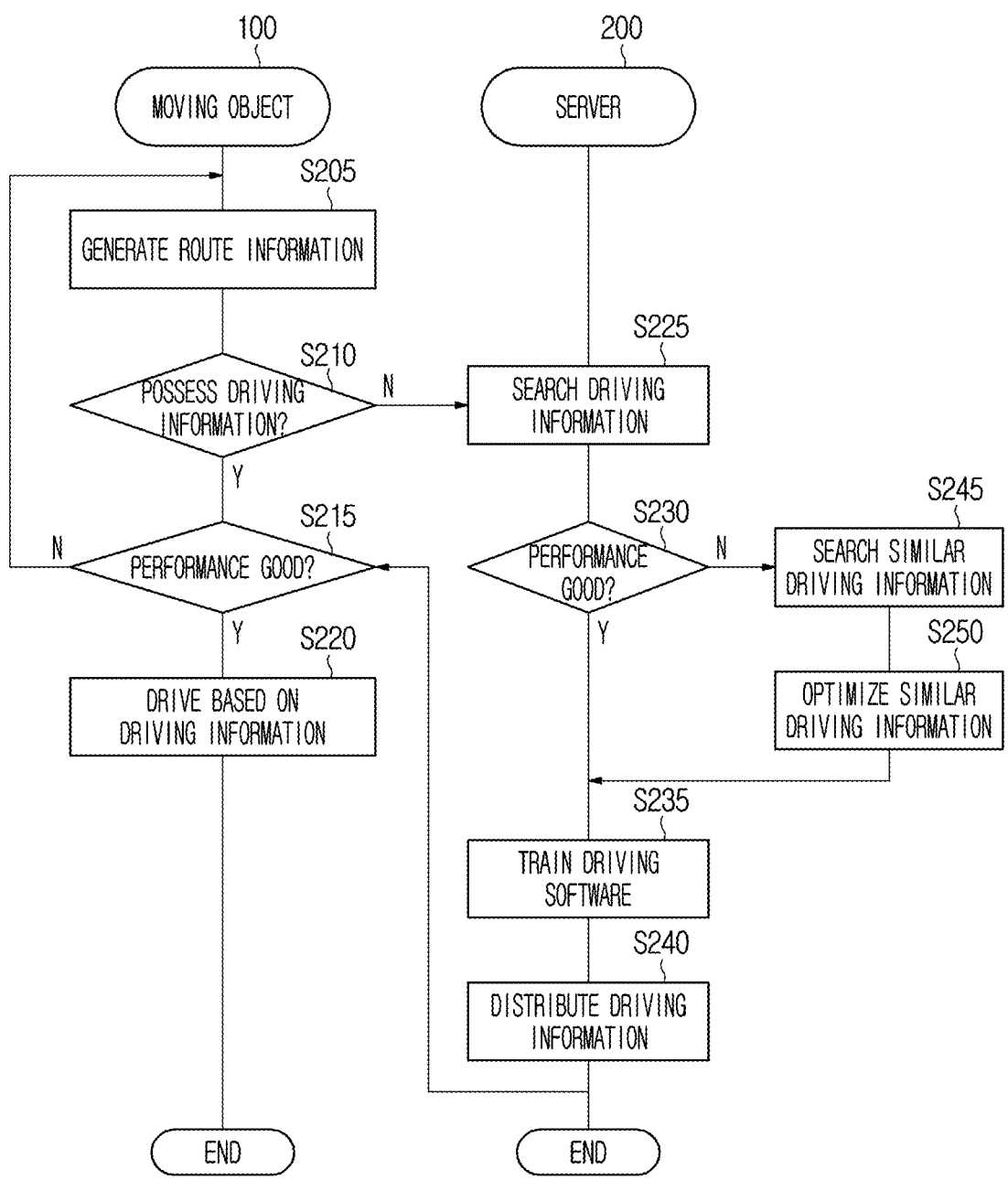
FIG. 5 is a flowchart for a method of controlling autonomous driving implemented between a moving object and a server in accordance with another embodiment of the present disclosure.

FIG. 5 is a flowchart for a method of controlling autonomous driving implemented between a moving object and a server in accordance with another embodiment of the present disclosure. The present disclosure exemplifies a case in which, when no driving information is present in the moving object 100, driving information is obtained from the server 200. In addition, the server 200 may handle the process below by using the processor 300 exemplified in FIG. 3.

First, the processor 118 of the moving object 100 may generate global and local route information by using the route provision unit 108 as in steps S105 to S115 of FIG. 4 (S205).

Next, the processor 118 may use the search unit 302 to ask the associated information management unit whether or not the memory 116 possesses driving information, based on global and local route information and associated information (S210).

As a result of the query, when the moving object 100 possesses driving information, the processor 118 may perform steps S120 to S130 of FIG. 4 and determine, like at step S135, whether or not the performance of trained software is good (S215). If the performance is good, like at step S135 and S140 of FIG. 4, the processor 118 may distribute driving information and control the moving object 100 to drive based on driving information (S220). If the performance is not good, the processor 118 may perform steps S105 to S130 again like in FIG. 4.

As a result of the query, when the moving object 100 does not possess driving information, the moving object 100 may request to search driving information to the server 200, and the server 200 may search driving information (S225).

For the search of driving information, the server 200 may receive, from the moving object 100, global and local route information, associated information associated with the route information, and driving data associated with a surrounding environment that the moving object 100 recognizes. In addition, the server 200 may receive, from the ITS device 202 and another object, associated information associated with route information and driving data through recognition of a surrounding environment. For example, associated information received from an external device may include observation information, event information, road information, waypoint information, map information and space information. The above-described information received from an external device may be updated to be a latest version of information.

When the moving object 100 autonomously drives on a new route or in a new area or environment, the application of driving information possessed by the moving object 100 may not be appropriate. The server 200 may search driving information by using route information, associated information and a search query that is extracted from driving data of the moving object 100. For example, the search query may be generated based on metadata that is derived from the above-described information. In addition, the search query may further include metadata associated with a driving scenario that is predicted based on the above-described information.

The server 200 and the moving object 100 may consist of schemas, and core keywords constituting a schema and a model connected by the keywords may be differently defined. Another autonomous driving moving object and the ITS device 202 are actually the same as described above.

A search algorithm implemented in the server 200 may register pre-accumulated driving information, that is, keywords and contexts representing driving data and driving software in metadata. When the server 200 searches driving information, for a situation where representation schemes according to metadata are identical, they may be different according to the moving object 100 and another device (for example, the server 200, the ITS device 202, and another autonomous driving moving object). Accordingly, the server 200 may search driving information by analyzing similarity for keywords and contexts.

In the case of raw data collected to generate associated information, metadata capable of explaining the collected data may not be recorded in some cases. Accordingly, it may be necessary to input metadata for the collected data.

Metadata of collected data may be input by a specific operator or be recorded by using artificial intelligence recognition models that input state information in collected data.

For example, raw data may be collected by using an observation sensor, a positioning sensor, and an assistant sensor, and when the collected data is input into the recognition model, metadata may be analyzed. For example, the assistant sensor may be a weather sensor, a barometer, and a temperature. By utilizing synchronization, a sensor fusing process, and a geo-referencing process for the collected data, the collected data may be multiplexed and input into the recognition model.

The matching between a positioning sensor and an observation/assistant sensor enables a geo-referencing process of collected data. When representing a location, a horizontal location, a vertical location or a three-dimensional coordinate may be expressed. The location or coordinate may be expressed by a predetermined mathematical model or criterion.

In the case of fusion information between sensors, collected data may be combined through the temporal information and geometric information of sensors. As for observation sensor data, data collected from an observation sensor may be fused and analyzed by using an internal parameter, an external parameter and positioning information for a geometric model of the sensor.

As an example, recognition information recognized in image data may be associated with LiDAR data and be registered as three-dimensional location information. A distance to an object on a three-dimensional coordinate system and an observation angle may be analyzed and be registered.

When multiple pieces of image data are connected, matching and fusion between the image data may be processed by estimating characteristics of a camera and a lens and an analysis model that are applied to each piece of the image data. The characteristics may be a focal distance, a principal point, lens distortion, and skew coefficient variables in an equation based on a projection principle of a camera and a lens, for example, a collinearity condition equation. For example, the analysis model may be at least one of a mathematically defined projection model, a polynomial proportion model, a homography model, and an affine model.

When multiple pieces of LiDAR data are connected, matching and fusion between LiDAR data may be processed by estimating variables of a laser projection angle, a distance scale, and an angle scale on a LiDAR device.

When camera data and LiDAR data are connected, a location value and a posture value, which connect the geometry between an image and LiDAR sensors, may be estimated as variables for a predetermined conversion equation. For example, the conversion equation may be an equation associated with rigid body transformation and similarity transformation. In order to give geo-referencing information, the variables may be fused with positioning and assistant sensor data.

object information and observation information and, to which a geo-referenced position is assigned, may be combined with detailed map information, and situation information for an object may be combined with the above-listed information to be represented as metadata. For example, situation information traffic infrastructure information and weather information, which change according to a situation, and the traffic infrastructure information may be information on traffic lights, crossings and intersections.

The operation of a traffic light showing a specific situation varies according to time and may affect a driving route, an autonomous driving plan, determination and control. The situation information of an object may be defined as metadata according to, for example, the operation of each traffic light. In addition, by tracking data in a specific time section, the tendency of data may be analyzed, and metadata may be defined based on the tendency.

Apart from traffic infrastructure information and event information (for example, traffic congestion, maintenance work), surrounding information associated with a lane change of a nearby dynamic object and a movement of a pedestrian on a crossing may be defined as information used for autonomous driving control.

Metadata of the above-described information is registered to a database of the server 200, and the server 200 may search driving information based on route information, a search query extracted from associated information and metadata.

Next, when the server 200 determines that the searched driving information has good performance (Y of S230), the server 200 may train driving software by using information received from the moving object 100 and searched driving data (S235) and distribute driving information to the moving object 100 (S240). For example, the moving object 100 may download driving information from the server 200 under a predetermined condition, for example, during the stop or driving of the moving object 100 at a predetermined speed or below and in an area with good communication state. Like at step S135 of FIG. 4, the moving object 100 may evaluate whether or not the distributed driving information, for example, the performance of driving software is suitable for a situation of the moving object. In case the performance is good, the processor 118 may control the driving of the moving object 100 based on the driving information distributed from the server 200.

Meanwhile, when the searched driving information has poor performance (N of S230), the server 200 may search similar driving information by using a search query extracted from information of the moving object 100 and metadata given to driving information of the server 200 (S245).

For example, the server 200 may search similar driving information used in a similar situation to the moving object 100 that is estimated from route information, associated information and driving data. In addition, the server 200 may preferably select driving information with high frequency of usage among searched similar driving information.

Next, the server 200 may analyze, learn and optimize similar driving information to be suitable for a driving situation of the moving object 100 (S250). For example, similar driving software may be update or modified based on driving data obtained from the moving object 100 and an external device. Then, like at steps S235 and S240, the optimized driving information may be learned by the server 200 and be distributed to the moving object 100.

The present disclosure exemplifies a case in which, if the moving object 100 possesses no adequate software for route information and associated information, the server 200 provides driving software or retain and then provides driving software to the moving object 100.

As another example, when the moving object 100 does not possess the adequate driving software, the moving object 100 may obtain driving data from an external device or the moving object 100 may generate virtual driving data by simulating a driving situation. For example, the external device may be at least one of the server 200, the ITS device 202, and another moving object 204. The moving object 100 may update or modify driving software possessed by it by using at least one input data of external driving data and virtual driving data. The updated or modified driving software may be applied to the moving object 100.

Figure 6:
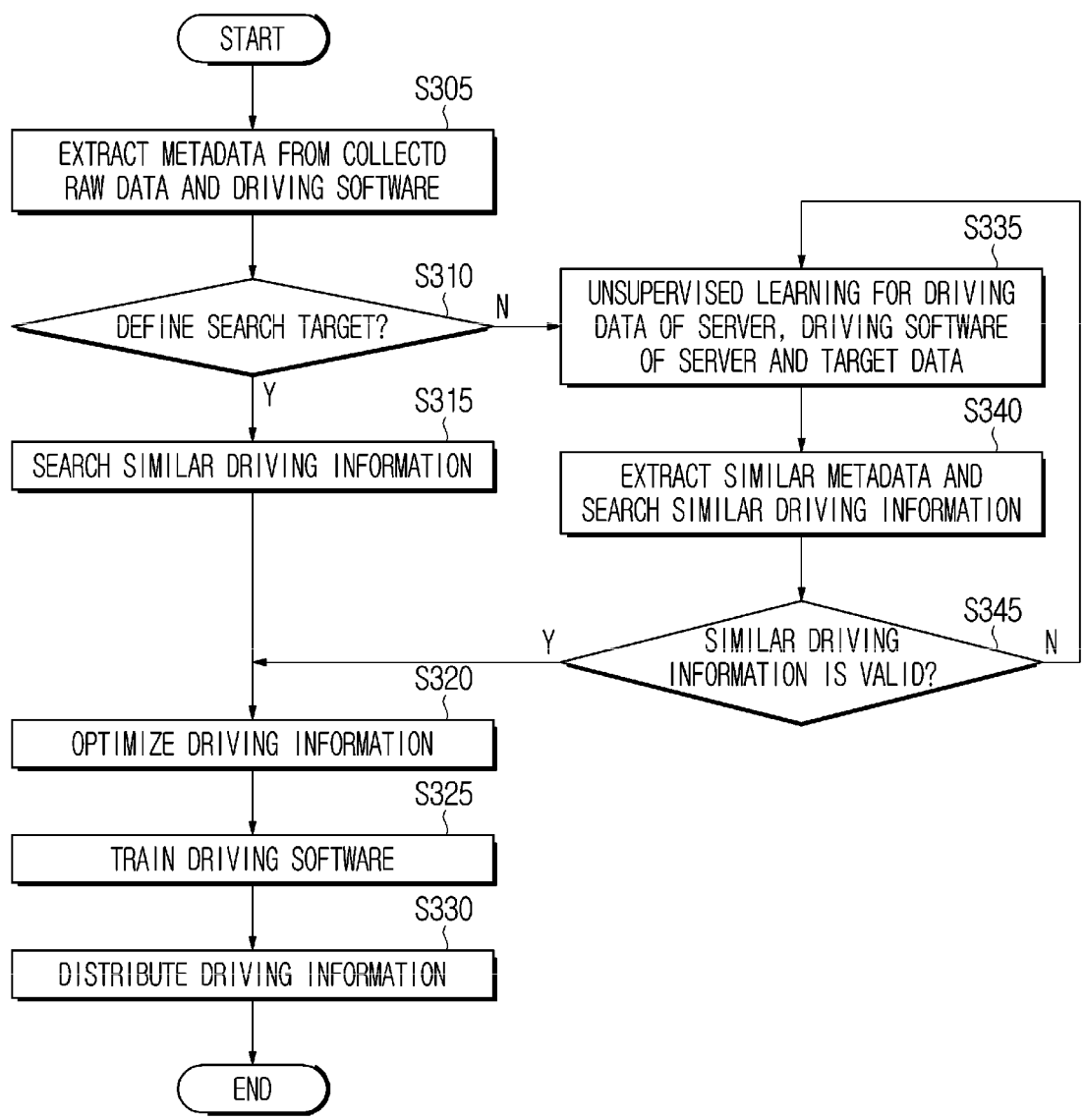
FIG. 6 is a flowchart for a search process of similar driving information.

FIG. 6 is a flowchart for a search process of similar driving information.

The disclosure according to FIG. 6 exemplifies a process of searching similar driving information when metadata used for the search in FIG. 4 and FIG. 5 is not defined as metadata given to driving information.

First, the processor 118 of the moving object 100 may extract metadata from collected raw data and possessed driving software (S305).

Collected raw data is associated information collected in real time such as observation information, event information, moving object state information, and constraint information, but is not limited to the above-described example. In addition, metadata may be extracted from route information and a driving scenario.

Next, the processor 118 may check, even though collected data and driving software have different metadata, whether or not the definition of target data for search can be inferred from metadata according to the collected data (S310).

As an example, when a surrounding situation, a traffic situation and a moving object state are identified from at least one of collected data, route information, associated information and a driving scenario, it may be determined that the definition of target data has been normally inferred. Whether or not target data is defined is indicated at step S310 of FIG. 6 through whether or not a search target is defined. As another example, when requirement information for driving control inferred from the above-described information and driving scenario is inferred from target data, it may be determined that the definition of the target data has been normally inferred. For example, a large commercial vehicle may have to observe safety regulations in bad weather and be controlled to satisfy a required driving time according to pattern information at the same time. In this case, the requirement information may infer the above-described condition from the route information of the vehicle, associated information and metadata of a driving scenario.

If the definition of target data is inferred, the processor 118 may analyze similarity of metadata between both sides and search similar driving information suitable for target data (S315).

Next, the processor 118 may optimize similar driving information (S320) and learn and distribute driving software (S325, S330) similarly to steps S125 and S130.

Meanwhile, when the definition of target data is not inferred, the processor 118 may request the server 200 to search similar driving information. The server 200 may receive metadata and target data of the moving object 100. The server 200 may analyze target data and driving information of the server 200 through clustering by means of unsupervised learning, which uses similarity between the target data and the driving data and driving software possessed by the server 200 (S335).

Next, depending on an analysis result, the server 200 may extract similar metadata close to the target data and metadata of the moving object 100 and search similar driving information based on the similar metadata (S340).

Next, based on the metadata received from the moving object 100, the server 200 may analyze to see whether or not similar driving information is applicable (S345). When effective application is determined, the server 200 may transmit the similar driving information to the moving object 100.

Figure 7:
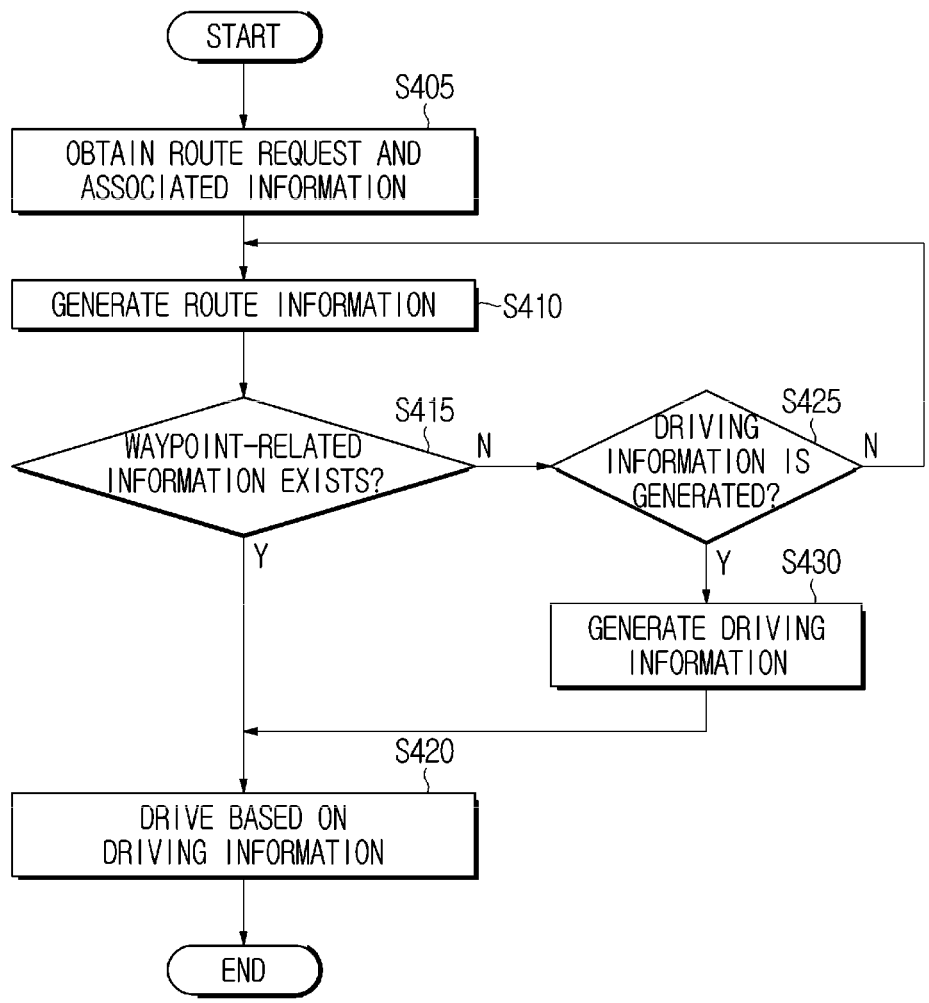
FIG. 7 is a flowchart for a method of controlling autonomous driving based on waypoint information according to yet another embodiment of the present disclosure.

FIG. 7 is a flowchart for a method of controlling autonomous driving based on waypoint information according to yet another embodiment of the present disclosure.

First, like in the above-described examples, the processor 118 of the moving object 100 may receive a route request and obtain associated information (S405) and generate global and local route information (S410).

The present disclosure exemplifies route information that includes waypoint information according to route request information, user information and moving object state information.

The processor 118 may check whether or not the memory 116 possesses waypoint-related information, that is, driving information (S415).

As an example, driving information associated with a waypoint may be associated with parking information of the waypoint. The parking information may be the number/size of parking spaces, a parking area for the handicapped, and an electric vehicle charging area. For example, the parking information may be expressed in forms of detailed maps, AI learning data and models.

When the moving object 100 already possesses driving data associated with a waypoint or is capable of obtaining it in real time, the processor 118 may be determined to possess the data.

Driving data of a waypoint will be described with an example of parking information. In the case of a detailed map, three-dimensional location information of static objects present in a parking lot, a connection between objects, and driving-related information may be mapped and managed. Information on a static object may include at least one of an identifier and an update history.

When a parking-related driving scenario is generated, geometric information of a parking space, attribute information of a parking space, and driving information in a parking space may be adopted as driving data. For example, attribute information may be a parking area for the handicapped and an electric vehicle charging area. For example, driving information may include a usage state of a parking space, an expected movement line in a parking space, and additional information necessary for autonomous driving or manual driving.

Driving software may process driving control for access to a waypoint and parking based on driving data containing parking information and other information. For example, other information may include user information for identifying the handicapped, information of moving object for identifying an electric vehicle, moving object state information for identifying a residual amount of energy, and pattern information for identifying a typical behavior of a moving object at a waypoint.

Based on history information of the moving object 100, the processor 118 may search an access road related to a waypoint, parking-related driving data, and driving software applied to a waypoint. In addition, as an example, the processor 118 may obtain observation information of a waypoint through an observation sensor and the communication unit 104. Specifically, in order to recognize information associated with driving data, the moving object 100 may receive information registered in an infrastructure system of a waypoint as driving data.

When the processor 118 confirms that driving information associated with a waypoint is possessed, the processor 118 may control the moving object 100, as in FIG. 4, to perform driving associated with the waypoint based on the possessed driving information (S420). Based on driving data that is obtained in real time during a driving process at a waypoint, the processor 118 may update driving software and control driving based on the updated driving software.

Unlike this, when there is no driving information, the processor 118 may determine whether or not driving information of a waypoint can be generated, by using other driving information possessed by the moving object 100 and driving information of an external device associated with the waypoint (S425).

As an example, the processor 118 may not possess the parking information and driving software of a waypoint and but determine whether or not driving information can be generated based on the parking information and driving software of another waypoint that has a similar environment to that of the waypoint. Specifically, the processor 118 may use the driving data and similar driving data, which the moving object 100 partially possesses, to retrain or modify similar driving software and thus determine whether or not driving information of a waypoint can be generated.

As another example, the processor 118 may determine whether or not driving information of a waypoint can be generated based on received driving information, by requesting driving information of the waypoint and a similar environment to an external device. The moving object 100 may receive driving information through the server 200, the ITS device 202 and V2X (vehicle to everything) by another moving object.

As yet another example, by requesting the server 200 to generate driving information of a waypoint, the processor 118 may check whether or not driving information can be obtained from the server 200 and determine whether or not driving information is generated.

In the above-described example, in order to enable the moving object 100 to have such a behavior as driving, parking, stop, waypoint and charging, driving data may be provided with its format transformed into raster, vector, feature and tensor.

If driving information can be generated, the processor 118 may generate or obtain driving information (S430) and control the moving object 100 to perform driving associated with a waypoint based on the driving information (S420).

If driving information cannot be generated, the processor 118 may regenerate global and local route information. As an example, the processor 118 may reset route information to a route excluding a waypoint. As another example, the processor 118 may include a waypoint in a route but switch driving control associated with parking control to manual driving.

Figure 8:
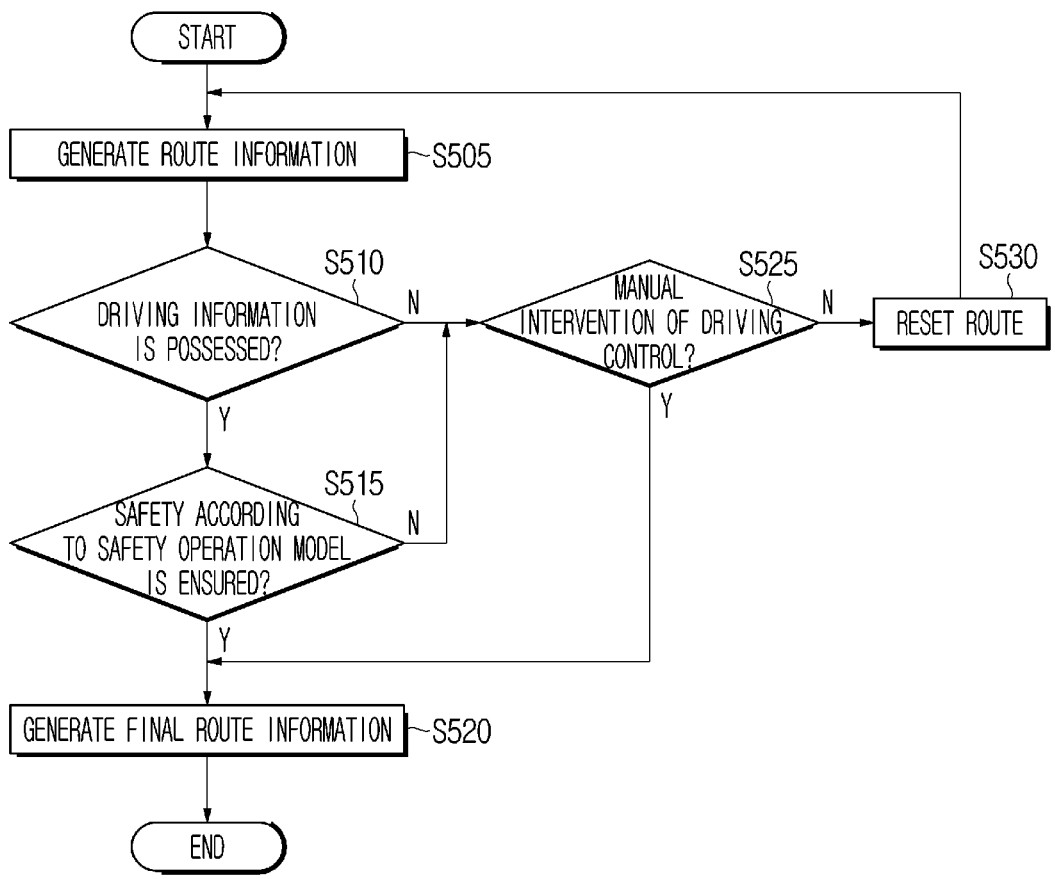
FIG. 8 is a flowchart for method of controlling autonomous driving based on constraint information according to yet another embodiment of the present disclosure.

FIG. 8 is a flowchart for method of controlling autonomous driving based on constraint information according to yet another embodiment of the present disclosure.

First, like in the above-described examples, the processor 118 of the moving object 100 may receive a route request, obtain associated information, and generate initial route information (S505).

The present disclosure exemplifies initial route information, that is initial global route information and initial local route information that are generated according to route request information, information of moving object, constraint information, road information, and moving object state information.

Similarly to steps S415, S425 and S430 of FIG. 7, the processor 118 may determine whether or not driving information can be possessed (S510).

When driving information is possessed, the processor 118 may determine whether or not the driving information ensures safety according to a safety operation model (S515).

The safety operation model may be a model that is built up based on the regulation and certification, which the moving object 100 will observe when autonomous driving is applied on a route, the past accident information and accident responsibility information that the moving object 100 will refer to, a road environment on the route, and handling information for an emergency situation.

For example, as for certification, the safety ranking may be different set according to the type of the moving object 100, manufacturer, model and occupant. In addition, the certification of safety may be different between a regular section and an irregular section. For example, an irregular section may be a school zone and an unpaved road. Certification may include a scenario for which a standard certification organization guarantees safety. When a standardized certification system is prepared for a region with high risk, certification may be required by the system.

For example, the past accident information may include a real accident of the moving object 100 or a similar moving object on a route, a damage range of an accident, and an accident probability at a specific point. The accident responsibility information may include responsibility for an accident on a route and a responsibility scope.

For example, the handling information for an emergency situation may include an emergency scenario for handling failure of the sensor unit 102 and the component unit 110, which affect the driving control of the moving object 100 operating autonomous driving, a disaster on a route, or an emergency situation by an accident. For example, an emergency scenario for failure may include information associated with parking and stopping areas and remote support areas.

If the safety of driving information is ensured, the processor 118 may train driving software based on a safety operation model about initial route information and driving data and generate final route information (S520).

For example, driving software may be processed to ensure safety by minimizing the possibility to violate regulations according to autonomous driving, the probability of accident, and the obscurity of responsibility scope. The processing of the driving software may be the update, retraining or modification for software at step S510.

Driving software may be processed based on certification-related information. As described above, certification-related information may include a safety ranking according to information of moving object and occupants, a certification system applicable to a region with high risk, and a scenario of a standard certification organization.

When the moving object 100 runs a point designated in a safety operation model, driving data may be obtained in real time through V2X with an external device, and driving software may reflect and process the obtained driving data. In this case, the driving data is useful when an observation sensor has low specification or an accuracy equal to or below a predetermined criterion or an object in a blind zone of sensing is not recognized.

In case an emergency situation occurs, the moving object 100 may set a route with strengthened safety according to an emergency scenario of the safety operation model and driving information.

If driving information is not possessed or safety is not ensured at step S510 or S515, the processor 118 may switch the driving control at a specific point on a route from autonomous driving to manual operation, thereby determining whether or not manual intervention is to be applied (S525).

When manual intervention is applied, the processor 118 may provide, through the route provision unit 108, a route that is inferred to ensure a highest degree of safety at a specific point.

If manual intervention is not applied, the processor 118 may reset route information by modifying initial route information according to route request information, information of moving object, constraint information, road information, and moving object state information.

For example, route information may be global route information and be set as a route that makes a detour around a specific point for which safety is not ensured.

As an additional embodiment of the above-described disclosure, an embodiment of associated information including not only constraint information but also other information will be described below. For example, other information may include information of moving object associated with a large commercial vehicle, a vehicle use, and a driving purpose, event information including a traffic situation, state information of moving object including road information and freight information, and observation information.

A large commercial vehicle may be different from a car with respect to a driving route and driving information for autonomous driving. As shown in FIG. 8, driving information needs to be prepared to satisfy a regulation and a safety degree required for a large commercial vehicle, according to a size of a vehicle, capacity, a regulation, a certification, a road condition, and a maintenance work/accident area. Specifically, driving data may include a road section and a time of day, where a capacity limit is applied, and a road section where driving is impossible according to a traffic situation. Driving software is processed by further considering driving data according to the above-described example, and final route information may be generated accordingly.

In addition, when local route information of a specific point is generated, the route information may be configured as a route that is set in a lane unit, for example. In the case of driving control for a large commercial vehicle that changes the lane change or drives along a bend, driving data may include, for example, information on the number of lanes and available lane sections according to a traffic situation. For example, the traffic situation may be congestion on a corresponding road according to time of the day, a movement trajectory of another vehicle near the corresponding vehicle, an unavailable lane, and a current status of lanes due to the reduction in the number of lanes.

For example, in case a large commercial vehicle and a small vehicle stop side by side and take a left turn at an intersection, driving data may include available lanes, a turning radius of the large commercial vehicle, an expected movement trajectory of the small vehicle, an expected movement trajectory of a vehicle on the other side of the road, and a range of blind spot caused by the simultaneous left turn. Based on the data of the above-described example, driving software may process driving control of the large commercial vehicle. As an example, the large commercial vehicle with a larger turning radius than that of the small vehicle may stop in an outer lane from a centerline, that is, to the right of the small vehicle. In addition, in order to enable another vehicle to recognize both the small vehicle and the large vehicle, the large vehicle may take a left turn while following behind the small vehicle.

Figure 9:
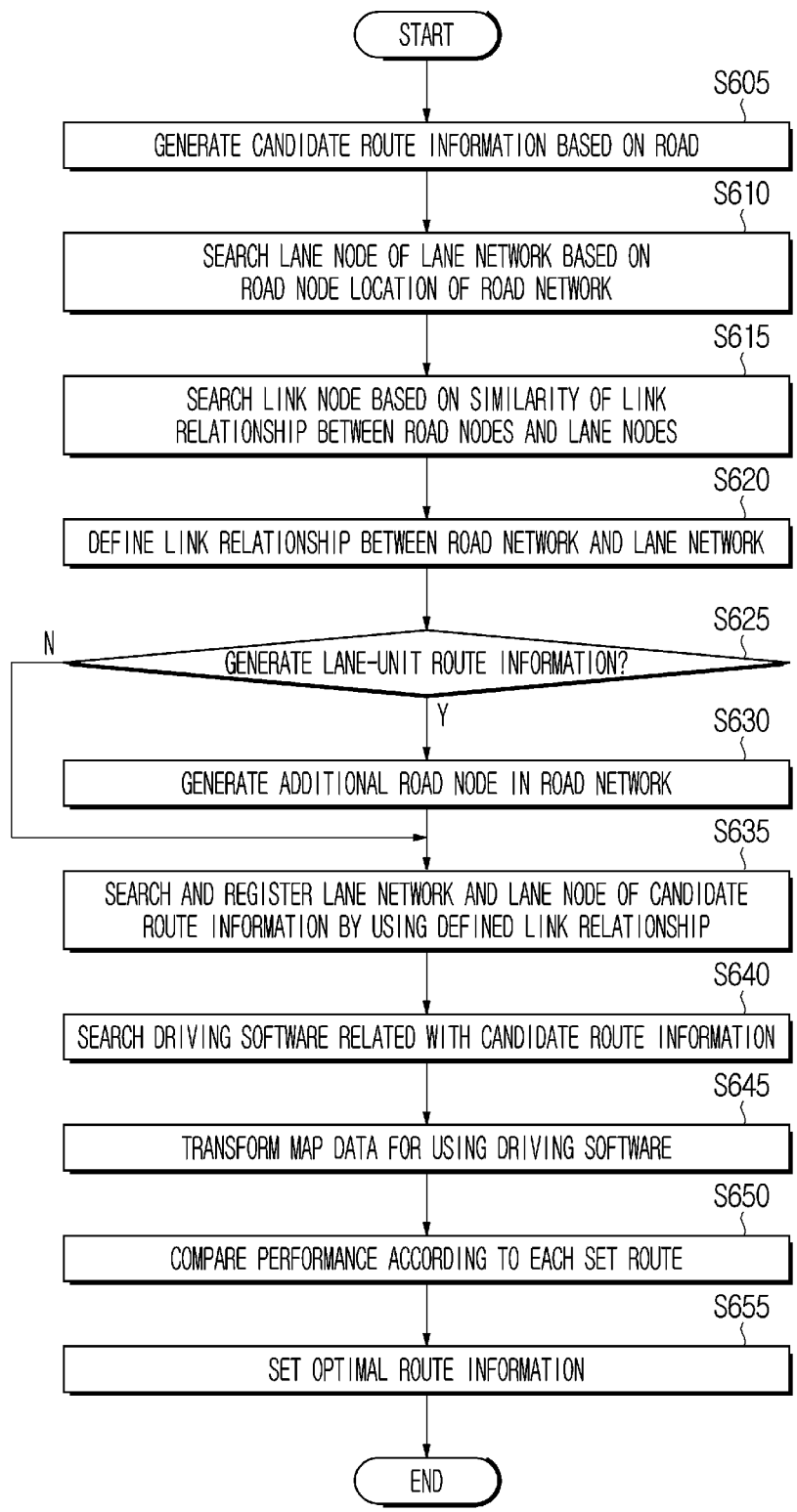
FIG. 9 is a flowchart for a process of generating route information based on heterogeneous map data.

FIG. 9 is a flowchart for a process of generating route information based on heterogeneous map data. The process according to the present disclosure may be implemented by at least one of the moving object 100 and the server 200. When the moving object 100 processes the process of the present disclosure, the process may be performed by the route provision unit 108, the associated information management unit 106, the memory 116 and the processor 118.

First, candidate route information may be generated based on route request information and associated information similarly to FIG. 4, (S605).

The candidate route information may be global route information and be route information based on roads. The candidate route information may be initial route information and be generated based on map information included in the associated information or map information that will be utilized as driving data. The map information may have a map based on a road network and a map based on a lane network. In this example, the initial candidate route information may be generated according to a road network-based map. Hereinafter, for convenience of description, the terms "road network-based map" and "land network-based map" may be abbreviated to "road map" and "lane map" respectively.

Next, a lane node of a lane network may be searched based on a road node location of a road network (S610).

Next, a link node may be searched based on similarity of link between road and lane nodes (S615). Next, the link between road and lane networks may be defined based on the searched connected node (S620).

The process after step S610 may be involved to establish a plan for the autonomous driving and local route of the moving object 100. A conventional route guidance navigation service may be performed based on a road network as global route information. Autonomous driving may apply cost-optimization models for minimizing the distance, time and fare on a route, and a plan of driving control may be established based on a detailed map that is defined in lane units. Accordingly, the linkage of data and/or software is required to connect a conventional navigation function and an autonomous driving function.

Referring to FIG. 10 to FIG. 14, the process from S610 to S620 will be described in detail. FIG. 10 to FIG. 14 are views exemplifying generation of a link node based on the heterogeneous map data of FIG. 9 or definition of connecting relationship through a link node. In order to connect data between a road map and a lane map, the above processes may use data with vector form that is employed as a criterion for both sides of data. The data with vector form may include point-shaped node information, line-shaped link information, and plane-shaped polygons.

Figure 10:
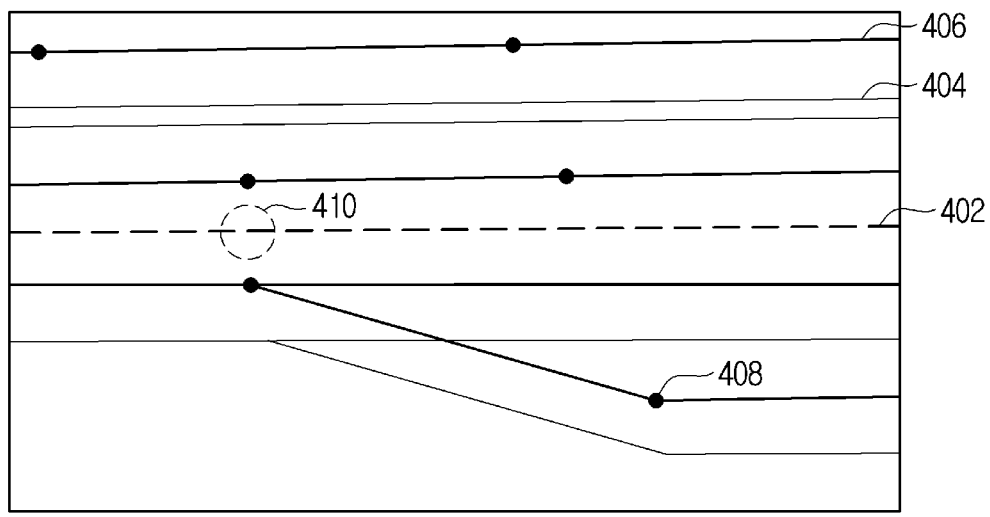
FIG. 10 to FIG. 14 are views exemplifying generation of a link node based on the heterogeneous map data of FIG. 9 or definition of connecting relationship through a link node.

As exemplified in FIG. 10, a road map and a lane map are heterogeneous map data and thus may have a different scheme of representation. For example, a road map may represent a road network 402, and a lane map may represent a lane 404 of a corresponding road, a lane network 406, and a lane node 408 in the lane network 406.

As exemplified in FIG. 10, the lane node 408 may be searched based on the lane network 406 located around a specific road node of the road network 402.

Road and lane maps may be different according to a determination scheme in a node unit. The node unit may be determined according to a stop line, a fork and a junction on a road, a U-turn spot, an intersection, a change point according to each road type, the number of lanes at a tollgate, and a road form (shape, curvature, type, slope).

In the case of node-based matching, a node connected between both maps may be searched using information on a phase relation connecting nodes. For example, the information may include at least one of the location, shape, attribute and link in the phase relation. When there is no connected node, an additional node is randomly given on the road map to construct link information between the two maps, and thus link information between representation schemes of the two maps may be managed. As exemplified in FIG. 10, when the lane node 408 is defined as a lane fork but there is no fork on the road map so that no link relation is defined, any node 410 may be generated on a road network in order to define link relation.

Figure 11:
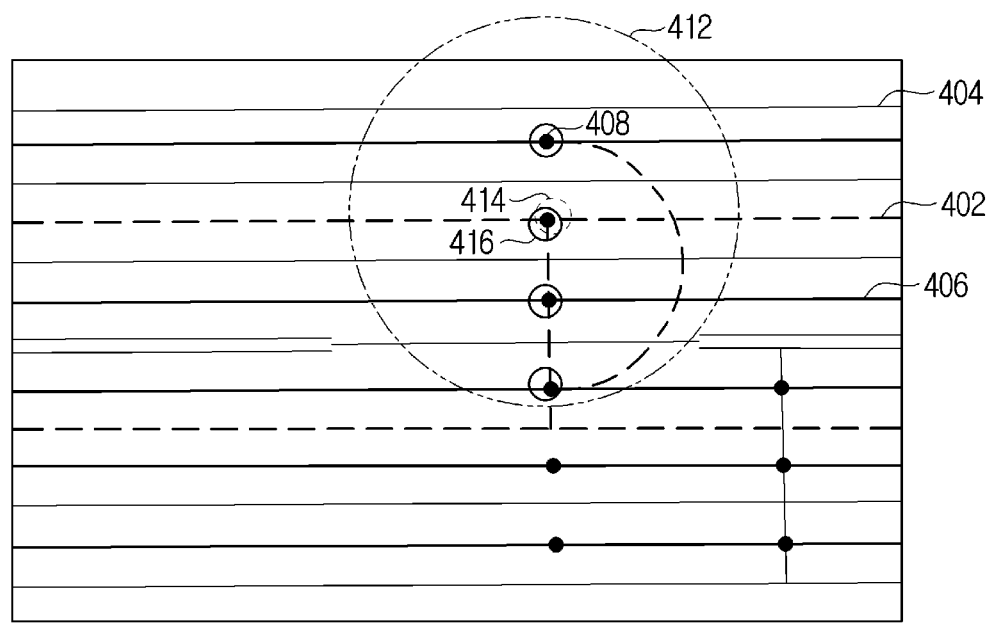

As exemplified in FIG. 11, when a link scheme based on locations searches the lane node 408 adjacent to the reference node 414 on the road map in a search range based on location values, the lane node 408 may be determined as the lane node 416 matched with the reference node 414 in the search range. For example, the search range may be set based on a driving location of the moving object 100, an observation range of an observation sensor mounted on a neighbor moving object, and the like. For example, the adjacent lane node 408 may be searched based on the KNN technique. The searched lane node 416 may be a node that is searched based on a location coordinate.

Figure 12:
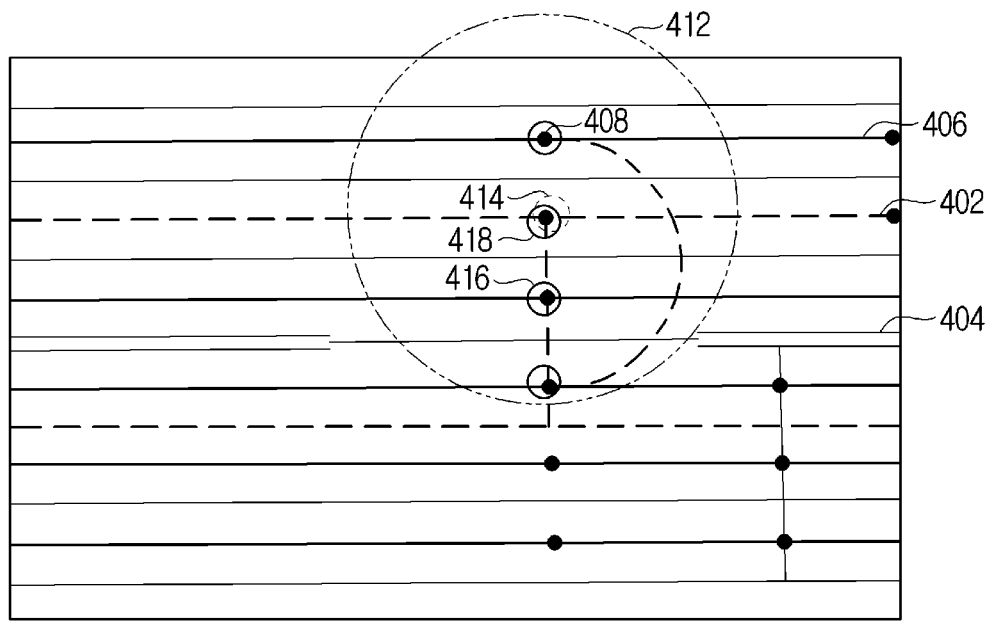

As exemplified in FIG. 12, the lane node 408 adjacent to the reference node 414 may be searched as the lane node 418 within the search range 412, based on a heading direction of a road and a lane, a node connected along the heading direction, and a U-turn spot. The searched lane node 418 may be a node that is searched based on a location coordinate, a phase, and an attribute. Another lane node 416 searched in FIG. 12 may be a node that is searched in a same scheme as that of FIG. 11.

Meanwhile, road and lane maps may have various link relations like 1:1, 1:M, N:1 and N:M, since they have a different number of nodes registered at a node split point. For example, a node split point may be a point where roads or lanes fork, join, cross or curve.

When a link of reference nodes between heterogeneous maps is defined, data of the two nodes may be associated in 1:1 link relation. When 1:N link relation is determined, linkage information between nodes may define a link relation in an arrangement form for a material type (e.g., num, string, etc.). As another example of determining 1:N link relation, a link relation is defined at 1:1, a reference node and link phase information are additionally given to at least one of the two maps, and then a searchable format may be defined.

Figure 13:
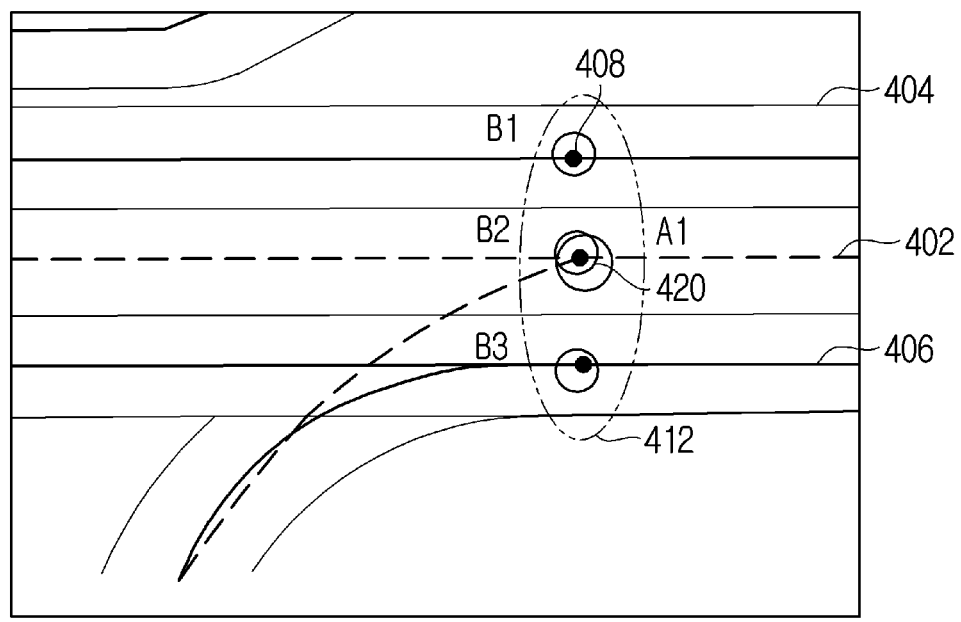
Figure 14:
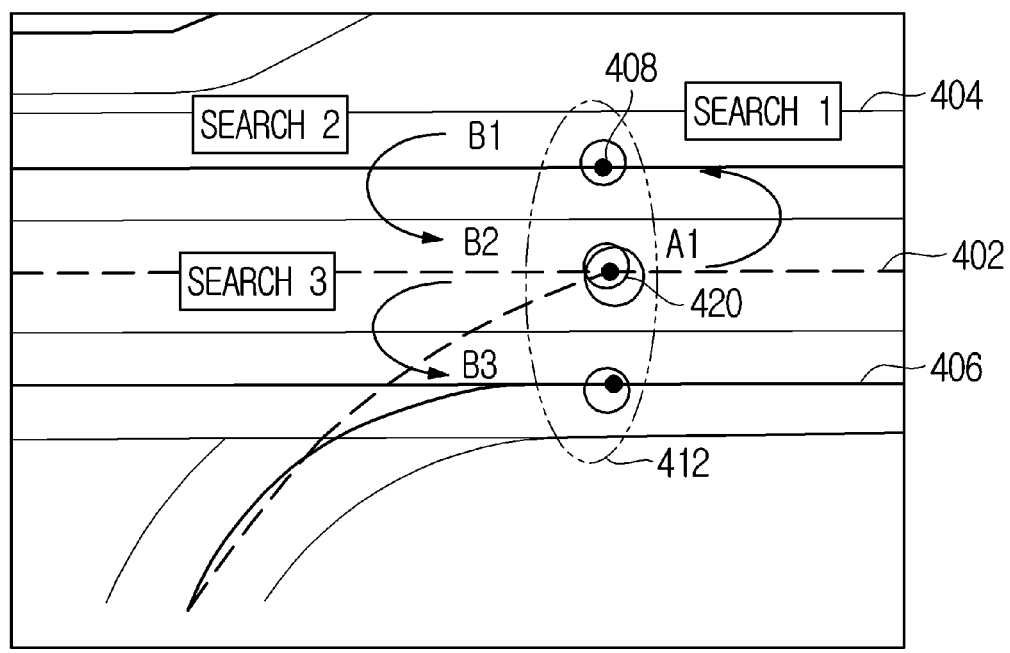

When generating a link relation between a road node A1 420 on a road map and lane nodes B1 to B3 408, as exemplified in FIG. 13, a link relation with A1 may be defined in an arrangement form for string materials like [B1, B2, B3]. In addition, as exemplified in FIG. 14, a link relation between A1 and B1 is defined, and a link relation between A1 420 and B1, B2 and B3 408 may be inferred based on a link relation of B1-B2-B3 defined in the lane network 406.

When a phase relation for N:M relation is defined, the connection may be made by setting a reference value in a mutual arrangement form. As another example, a 1:1 link between reference nodes may be expanded into an internal link relation of each map, and a format capable of sequential approach may be defined.

Next, whether or not lane-unit route information can be generated based on connection between the two networks may be determined (S625).

Referring to FIG. 9 again, lane-unit route information may be generated, and an additional road node may be generated in a road network (S630).

Lane-unit route information may be determined to be generated by matching a searched lane node and a lane link by a road node and a road link in candidate route information. The searched lane node may be generated as an additional road node in a road network.

The above-described steps S605 to S635 may constitute a detailed process of S110 and S115 of FIG. 4.

Next, by using a defined link relation between two networks, a lane network and a lane node may be searched in the candidate route information of step S605 and be registered in the candidate route information (S635).

Next, driving software associated with the candidate route information may be searched by using a similar method as that of FIG. 4 (S640). Step S640 may be a process corresponding to step S120 of FIG. 4.

Driving software may be searched based on driving data, which is associated with candidate route information and associated information, and initial transformed map data.

If the moving object 100 does not possess driving software satisfying the information, the moving object 100 may generate driving software by using at least one of driving data, which is obtained from an external device such as a SURROUNDING VEHICLE, a traffic system, a RSU, and a control center, and virtual driving data that is generated by simulating driving situations in the moving object 100. Specifically, the moving object 100 may update or modify driving software possessed by it by using at least one input data of external driving data and virtual driving data.

As an example of update or modification, driving software may be updated or modified based on direct use of the input data. As another example, driving software may be updated or modified based on specific data that is derived by analyzing the input data. As yet another example, driving software may be primarily updated or modified based on a portion of the input data, and the primarily processed driving software may be secondarily updated or modified based on another part of the input data.

As another example, the moving object 100 may obtain driving software suitable for the information by requesting to the server 200.

Next, map data included in map information may be transformed to be available for using driving software (S645).

Map information may include data associated with road and lane networks and further include a node and a link that are included in the above-defined link relation. Map data may be represented in a raster form or a vector form according to a use purpose. A format between heterogeneous data may be transformed according to expected driving software.

When vector data is transformed into a raster form, map data with multiple layers may be generated by a grid or other frames with a specific location unit, and closest, interpolated or extrapolated data may be given to a frame. Accordingly, a multi-dimensional raster data format may be generated. Multi-dimensional data may be transformed through a kernel like convolution and be analyzed by being fused with a driving trajectory. Thus, motion prediction may be analyzed for the moving object 100 and a neighbor object, or a local route plan may be established. In addition, multi-dimensional raster data may be transformed into multi-layered data with vector forms, and mutual-layered data thus transformed may be connected by a defined phase relation and be analyzed.

Next, by using a similar method to that of FIG. 4, driving software may be searched based on driving data, which is associated with candidate route information and associated information, and initial transformed map data, and may output at least one set route, and then performance for the output set route may be evaluated (S650).

Figure 15:
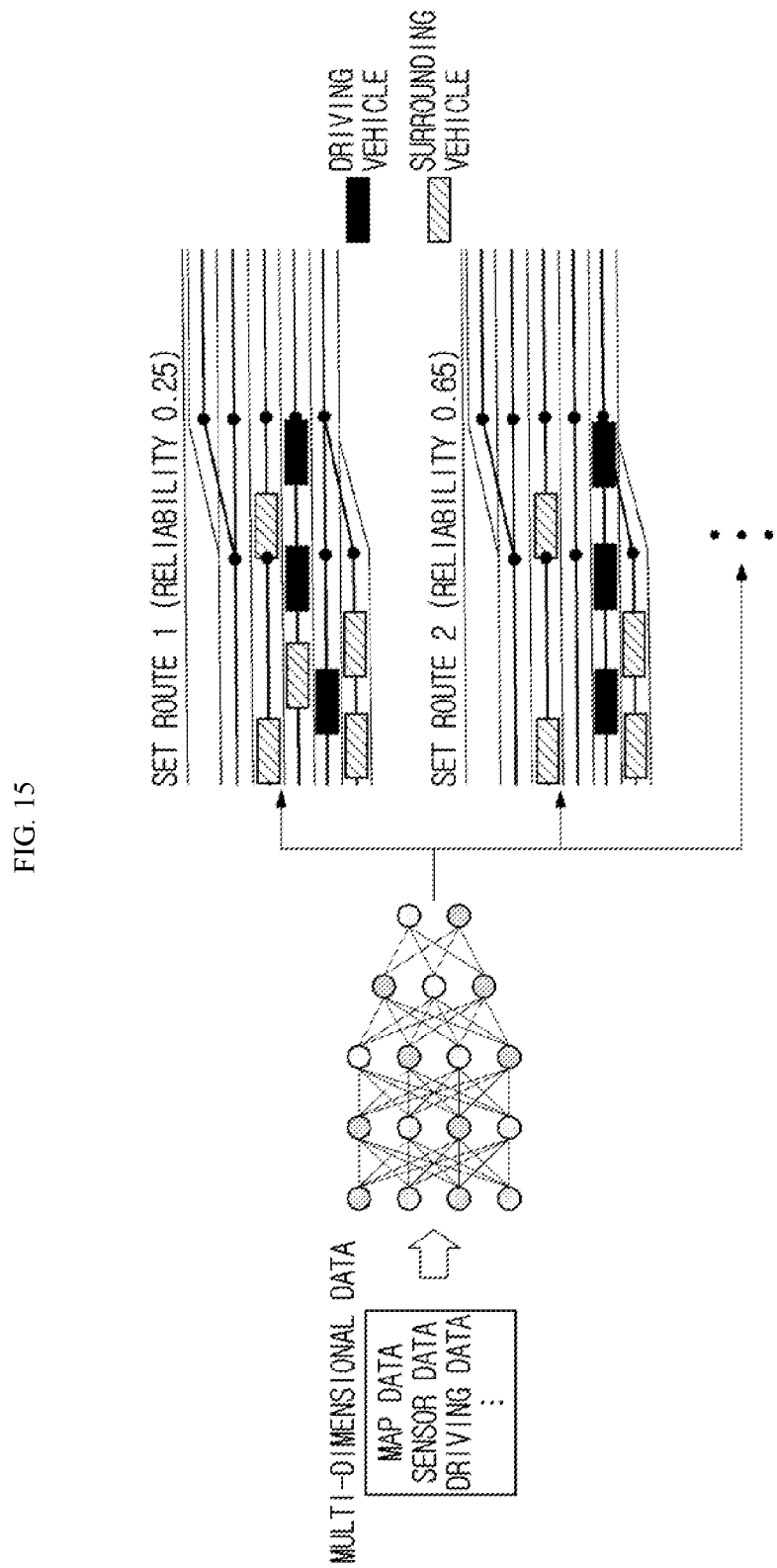
FIG. 15 is a view exemplifying performance estimation for each route based on multidimensional data.

As exemplified in FIG. 15, map data, sensor data and driving data, which belong to multi-dimensional data, may be fused and analyzed, so that reliability may be estimated for each of a plurality of set routes.

In addition, the movement of the moving object 100 around it may be identified by analyzing and interpreting sensor data of an observation sensor. Herein, driving data such as road information, observation information and map information may be fused and analyzed to generate a set route.

Fusion of multi-data may be processed in various manners according to a configuration of driving software. As an example, at an initial step, a fusion process between data may be performed, and fused data may be interpreted. As another example, analyzed result values may be fused and interpreted for each piece of data. As yet another example, mutual influence may be re-interpreted by fusing and interpreting data at a middle step of the above-described example or by giving an intermediate result value according to the analysis of each piece of data to the analysis.

Figure 16:
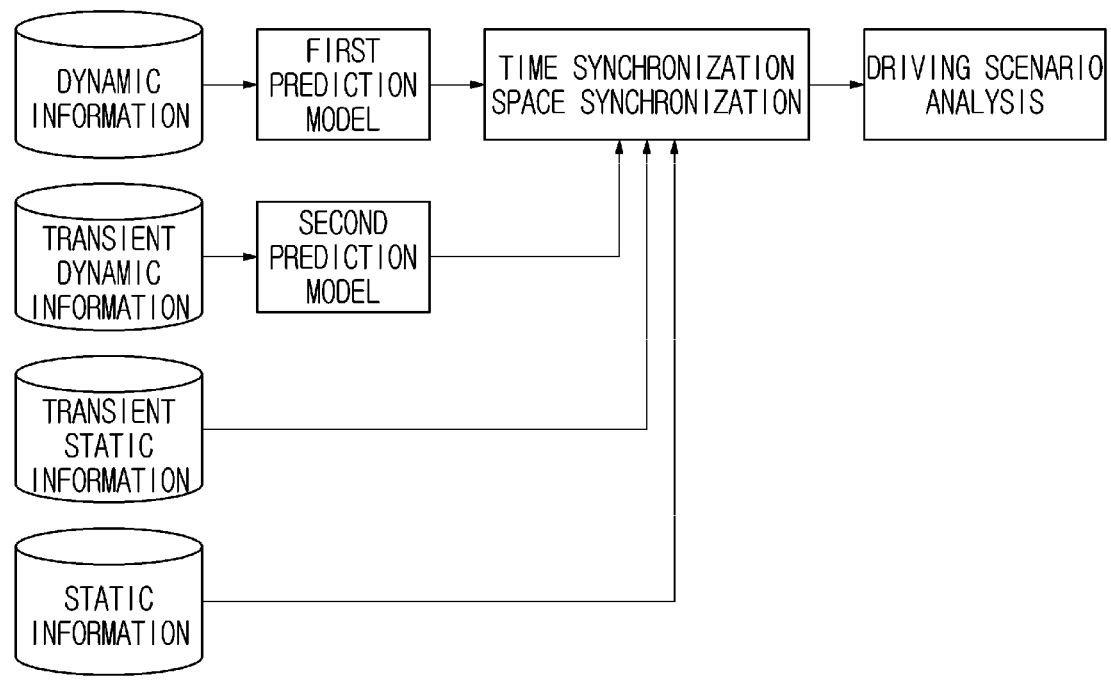
FIG. 16 is a conceptual diagram for a process of analyzing a driving scenario based on data collected from a moving object and external device.

Multi-layered data may have connectivity together with a route trajectory of the moving object 100. As exemplified in FIG. 16, static, transient static and transient dynamic information in map data may be connected with dynamic information through time and space synchronization. The information may be used as input data of driving software. Static, transient static, and transient dynamic information may be obtained by receiving data that is collected in an external device. In addition, dynamic information and transient dynamic information may generate a driving scenario by predicting behaviors of the moving object and a neighbor object through a corresponding prediction model, and the driving scenario may be used as input data for driving software.

Next, a set route representing optimal performance evaluation may be set as final optimal route information (S655).

Driving software used for setting final optimal route information may be updated or modified based on driving data and observation information that are obtained later.

Figure 17:
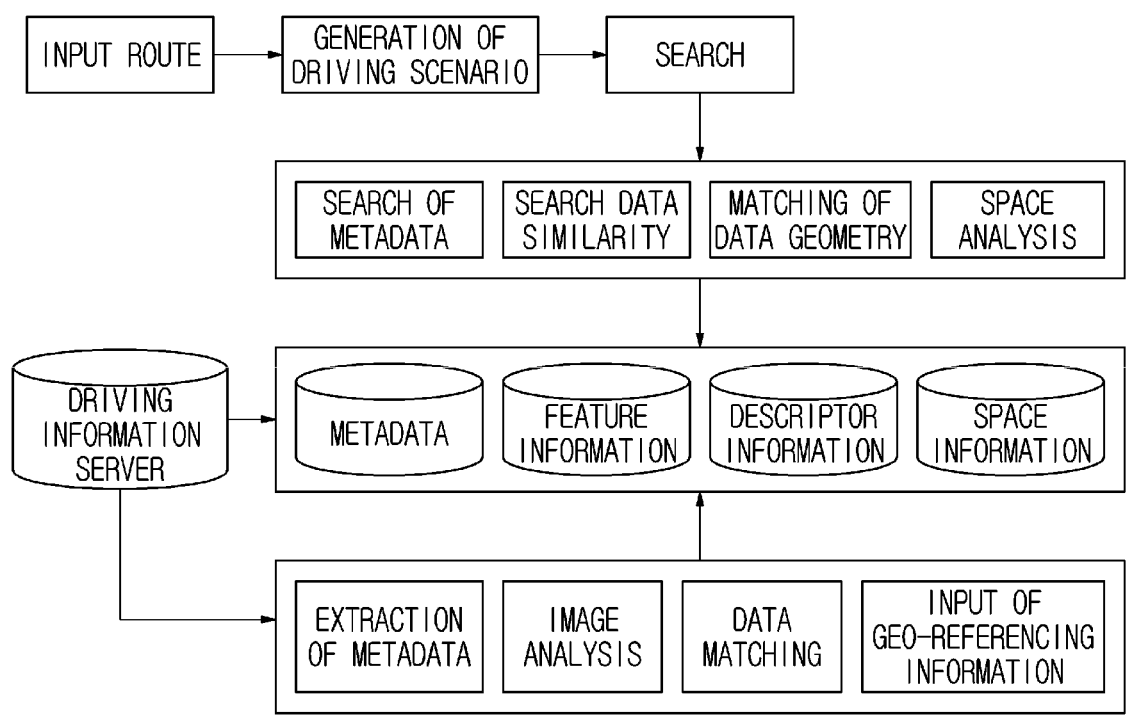
FIG. 17 is a conceptual diagram for a process of searching driving information based on a driving scenario.

FIG. 17 is a conceptual diagram for a process of searching driving information based on a driving scenario. The present disclosure exemplifies search and processing of driving information based on the driving scenario described in FIG. 4.

A driving scenario may be generated based on the route information and associated information of FIG. 4. As similarity between scenario data extracted from the driving scenario and existing information is analyzed, driving information may be searched. For example, scenario data may include an expected traffic situation, a driving environment, and a moving object state. Specifically, scenario data may be information that is input manually or automatically according to a road feature including a road shape and a road type, a traffic situation according to time of the day, a movement pattern of dynamic objects, and a use pattern of an occupant. Scenario data may include a keyword, a context, observation information, and space information that are associated with the above-described example.

Metadata is extracted from route information, a driving scenario and associated information and may be used to search related driving information possessed by at least one of the moving object 100 and the server 200. In addition, data geometry and space information may be analyzed based on accumulated associated information and driving data, and result values may be managed. Driving information may be searched through the matching and analysis of the above-described information for driving control, a scenario and a corresponding result value.

Meanwhile, the moving object 100 and the server 200 may accumulate driving information applied to driving control and generate additional information associated with driving information. The server 200 may accumulate driving information of another moving object. For example, additional information may include at least one of metadata, feature information, descriptor information, and space information. The moving object 100 and the server 200 may generate additional information with a different schema. In the moving object 100 and the server 200, additional information having similarity may be managed by being connected with a corresponding location or shape of an existing driving route.

For example, driving information and additional information may be managed in a form of hot spot according to a shape of road or lane, and a location. A physical distance from a specific location may be used as a weight for similarity analysis of the above-descried driving information. Furthermore, in a specific region that is already accumulated in relation to a route of the moving object 100, a driving scenario may be utilized as a current driving scenario.

For example, driving data is simulated data of space information for an expected traffic congestion at a specific time and may be used as information of a route setting. Space information may be divided into regions according to a predetermined method, and driving information according to an already accumulated driving scenario may be accumulated and recorded in each region. In addition, the safety of driving information and the autonomous driving performance may be accumulated in each region and be provided as a determination indicator of an optimal route. For example, the region may be a specific grid, a polygon, and a point, a line and a plane in units of road or lane. Accumulated driving data may update driving software that is already used.

Meanwhile, driving information may be stored by stratifying defined metadata or similarity analysis results. In addition, driving information, which is expected on a route, and relevant collected data may be listed and classified. The information and data thus classified may be generated by being simulated in detailed map information of map information. Detailed map information may include various information that is already accumulated, for example, static object information, a route of a dynamic object, information on mutual connection between the objects, road information, and event information. Such data may be used as driving data.

In case there is a restriction on defining driving information, which is applied on an existing route, as additional information, the driving information may be set to a lower priority than other information. In addition, driving information lower than other driving information or having lower user experience than a reference value may be set to a lower priority than other information. When user experience is low, a low priority may be set. Evaluation of user experience may be performed by analyzing the evaluation of occupants' driving and the moving object 100 that performs similar driving and user's satisfaction evaluation. Evaluations of user experience for identical/similar driving may be grouped to be analyzed.

Figure 18:
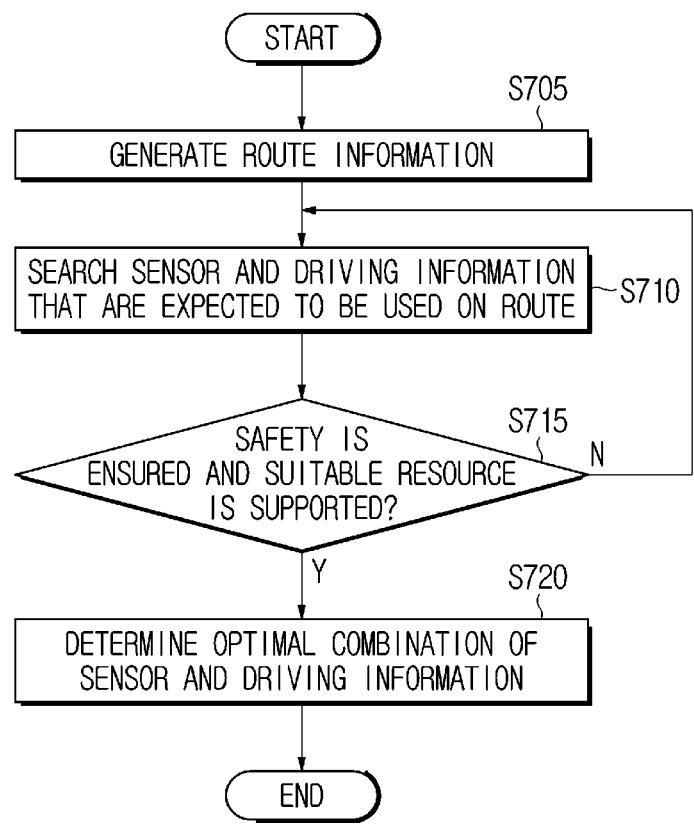
FIG. 18 is a flowchart for a process of determining an optimized combination between a sensor for obtaining and collecting data and driving information.

FIG. 18 is a flowchart for a process of determining an optimized combination between a sensor for obtaining and collecting data and driving information.

First, the processor 118 of the moving object 100 may generate route information in a similar method as that of FIG. 4 (S705).

Next, the processor 118 may search sensor and driving information of the sensor unit 102 that is expected to be used through route information (S710).

For example, a plurality of observation sensors may be used in the moving object 100. At least portion of the plurality of sensors may be used based on a use state of the sensor, performance, a traffic situation, a surrounding situation, a weather condition, and time. As another example, a sensor may be searched to use a portion of sensors thus used as little as possible.

Driving software belonging to driving information may also be searched based on the above-listed items and used sensors.

Next, the processor 118 may determine, based on a searched sensor and driving information, whether or not the safety of driving control is ensured and determine whether or not a sensor used for obtaining driving information and a resource allocated to driving information are supported (S715).

For example, the dependency on a specific sensor may be lowered, and it is possible to determine whether or not a combination selecting driving software according to lowered dependency satisfies both safety and resource support.

Next, the processor 118 may determine the combination satisfying an optimal reference value among a plurality of combinations of sensor and driving information in which safety and resource are supported.

The positioning sensor 102*a* like GNSS consumes lower energy than the image sensor 102*a* and the LiDAR sensor 102*c*, and data of the positioning sensor 102*a* may use lower computing resource that other sensors. In the case of a route using a highway, since the positioning sensor 102*a* enables easy reception and secures high positioning accuracy, the combination may be determined to minimize or exclude a positioning function based on image and LiDAR.

In case there is a traffic situation like traffic congestion, an accident, and a maintenance work, driving software may be selected according to a C-ITS infrastructure environment (provision environment of the ITS device 202). When information on congestion, traffic lights and the like is collected from C-ITS infrastructure, the dependency of the image sensor 102*b* for recognizing the information may be lowered. When analyzing a current traffic light state, a signal change time, and a relation between a traffic light and a route that are received from C-ITS infrastructure, it is possible to lower the dependency of driving software that processes traffic lights and associated information from data of the image sensor 102*b*. In addition, since the moving object 100 and a neighbor dynamic object have a relatively low change of position/state in a congested situation, the processing frequency of sensor data may be adjusted. Driving software may be selected according to the performance of an observation sensor that is affected according to driving environments like time, weather and tunnel space.

After the combination is determined, driving software possessed by the moving object 100 may be retrained based on driving data and sensor-related data that satisfy an optimal reference value.

If at least one of safety and resource is not supported, the processor 118 may search another sensor and other driving information again and perform steps S715 and S720 again.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for distributing a driving information for autonomous driving, the method comprising:
generating route information based on a route request of a moving object and associated information according to the route request;
searching and selecting the driving information including driving data and driving software, based on the route information and the associated information, wherein the driving data includes at least one of route, information of a waypoint, speed, or driving method, or any combination thereof, associated with the associated information;
training the driving software by using the route request, the associated information and the driving data;
distributing the driving information to the moving object;
executing, by a processor, driving control of the moving object based on the distributed driving information;
controlling, by the processor, power to front and rear wheels, a brake system, and a steering system of the moving object based on the distributed driving information,
wherein the moving object is an autonomous vehicle,
wherein the searching and selecting of the driving information further comprises:
searching sensors and driving software that are expected to be used on a route of the route information, in autonomous driving;
determining whether or not a safety is ensured and a resource is supported for using the searched sensors, when combination of the searched sensors and driving software selected based on the dependency of the combination of the searched sensors, that are expected to be used on the route, are used; and
determining a combination of the sensors and the driving software based on a traffic situation, a surrounding environment, time, and a weather condition according to the safety is ensured and the resource is supported,
wherein the driving software includes model parameters and weights for autonomous driving.

2. The method of claim 1, wherein the associated information includes at least one of route request information, user information of the moving object, the user's pattern information for a moving object, information of a moving object, moving object state information, observation information, event information, road information, map information, waypoint information, or constraint information, or any combination thereof.

3. The method of claim 1, wherein the searching of the driving information comprises searching and selecting the driving information stored in external device, when the driving information is not present in the moving object.

4. The method of claim 1, wherein the searching of the driving information is executed based on additional information that is derived from the route information, the associated information, the driving data and the driving software, and wherein the additional information includes at least one of metadata, image data, data geometry, or space data, or any combination thereof.

5. The method of claim 4, wherein the searching and selecting of the driving information further comprises:
extracting the metadata through clustering processing for the driving data, the driving software, and target data of the additional information, when definition of the target data of the additional information is not inferred; and
searching the driving information based on the extracted similar metadata.

6. The method of claim 1, wherein the searching and selecting of the driving information further comprises determining whether or not the driving data and the driving software ensure a safety according to a safety operation model, and
the method further comprises:
determining whether or not manual intervention of driving control of the moving object is permitted when the safety is not ensured; and
resetting route information of the moving object when the manual intervention is not permitted.

7. The method of claim 1, wherein the generating of the route information comprises:
generating candidate route information based on a road map;
defining a link relationship between a road network and a lane network, based on the road network of the road map, a road node of the road map, the lane network of a lane map associated with lanes included in the road, and a lane node of the lane map;
generating an additional node in the road network, based on the link relationship and the lane node, when route information in a lane unit is able to generated; and
registering the lane network and the lane node in the candidate route information by using the link relationship,
wherein the searching and selecting of the driving information comprises searching the driving software associated with the candidate route information, and
wherein the executing of the driving control of the moving object comprises:
generating a plurality of set routes by the driving software based on the candidate route information in which the lane network and the lane node are registered;
setting route information, which is determined through performance evaluation of a set route, as final route information; and
controlling the moving object based on the final route information.

8. The method of claim 1, further comprising generating a current driving scenario of the moving object based on the route information and the associated information before the searching and selecting of the driving information,
wherein the searching of the driving information further comprises searching the driving information based on the current driving scenario.

9. The method of claim 8, wherein the driving scenario is accumulated in association with past driving of the moving object and another moving object, and
wherein the searching of the driving information comprises searching the driving information based on the accumulated past driving scenario with assigned weight, wherein weights are assigned based on a location of a route that is estimated from the current driving scenario.

10. The method of claim 1, wherein the searching of the driving information further comprises when the moving object possesses no driving software associated with the route information and the associated information,
updating or modifying the driving software stored in the moving object by using, as input data, at least one of driving data obtained from an external device or simulated driving data generated by simulating a driving situation in the moving object, or any combination thereof.

11. The method of claim 10, wherein the updating or modifying of the driving software is performed by at least any one of update or modification processing of the driving software based on using of the input data, update or modification processing of the driving software based on specific data derived by analyzing the input data, and primary update or modification processing of the driving software based on a portion of the input data and secondary update or modification processing of the primary updated or modified driving software based on another portion of the input data.

12. A device for distributing a driving information for autonomous driving, the device comprising:
a memory configured to store at least one instruction; and
a processor configured to execute the at least one instruction stored in the memory,
wherein the processor is configured to:
generate route information based on a route request of a moving object and associated information according to the route request,
search and select the driving information including driving data and driving software, based on the route information and the associated information, wherein the driving data includes at least one of route, information of a waypoint, speed, or driving method, or any combination thereof, associated with the associated information,
train the driving software by using the route request, the associated information and the driving data,
distribute the driving information to the moving object,
execute driving control of the moving object based on the distributed driving information,
control power to front and rear wheels, a brake system, and a steering system of the moving object based on the distributed driving information,
wherein the moving object is an autonomous vehicle,
wherein the processor is further configured to:
search sensors and driving software that area expected to be used on a route of the route information, in autonomous driving:
determine whether or not a safety is ensured and a resource is supported for using the searched sensors, when combination of the searched sensors and driving software selected based on the dependency of the combination of the searched sensors, that are expected to be used on the route, are used; and
determine a combination of the sensors and the driving software based on a traffic situation, a surrounding environment, time and a weather condition according to the safety is ensured and the resource is supported,
wherein the driving software includes model parameters and weights for autonomous driving.

\* \* \* \* \*